United States Patent
Morioka et al.

(10) Patent No.: US 9,736,750 B2
(45) Date of Patent: Aug. 15, 2017

(54) RADIO COMMUNICATION SYSTEM AND COMMUNICATION CONTROL METHOD

(71) Applicant: NTT DOCOMO, INC., Tokyo (JP)

(72) Inventors: Yasufumi Morioka, Tokyo (JP); Kouki Hayashi, Tokyo (JP); Yoshifumi Morihiro, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/896,976

(22) PCT Filed: May 1, 2014

(86) PCT No.: PCT/JP2014/062090
§ 371 (c)(1),
(2) Date: Dec. 9, 2015

(87) PCT Pub. No.: WO2014/199742
PCT Pub. Date: Dec. 18, 2014

(65) Prior Publication Data
US 2016/0127974 A1  May 5, 2016

(30) Foreign Application Priority Data
Jun. 10, 2013 (JP) .................... 2013-122275

(51) Int. Cl.
*H04W 36/34* (2009.01)
*H04M 3/487* (2006.01)
(Continued)

(52) U.S. Cl.
CPC .......... *H04W 36/34* (2013.01); *H04M 3/487* (2013.01); *H04W 36/00* (2013.01); *H04W 36/32* (2013.01); *H04W 64/00* (2013.01)

(58) Field of Classification Search
CPC ...... H04W 36/00; H04W 36/34; H04W 24/00
See application file for complete search history.

(56) References Cited

U.S. PATENT DOCUMENTS

2010/0173626 A1*  7/2010  Catovic .............. H04W 76/027
                                                            455/423
2013/0115949 A1    5/2013  Centonza et al.

FOREIGN PATENT DOCUMENTS

| JP | 11-285050 A | 10/1999 |
| JP | 2004-236103 A | 8/2004 |

(Continued)

OTHER PUBLICATIONS

International Search Report issued in corresponding application No. PCT/JP2014/062090 mailed Jul. 22, 2014 (1 page).
(Continued)

*Primary Examiner* — Myron K Wyche
(74) *Attorney, Agent, or Firm* — Osha Liang LLP

(57) ABSTRACT

A radio communication system includes: a visit information storage unit that stores plural visit information elements each indicating information on a visit to a cell visited by a user equipment; a cell visit detector that detects that the user equipment that was visiting a first cell starts a visit to a second cell differing from the first cell; a ping-ponging state determiner that determines whether a ping-ponging state has occurred, in which state start and ending of a visit to the second cell is repeated, wherein the determination is made based on a visit information element on a visit to the second cell visited by the user equipment; and a calculator that calculates a visit time length of the visit to the second cell in accordance with the determination by the ping-ponging state determiner.

11 Claims, 19 Drawing Sheets

(51) Int. Cl.
*H04W 36/00* (2009.01)
*H04W 64/00* (2009.01)
*H04W 36/32* (2009.01)

(56) References Cited

FOREIGN PATENT DOCUMENTS

| | | |
|---|---|---|
| JP | 2010-262484 A | 11/2010 |
| JP | 2011-527156 A | 10/2011 |
| JP | 2012-249132 A | 12/2012 |
| JP | 2013-110728 A | 6/2013 |
| WO | 2010/002926 A1 | 1/2010 |

OTHER PUBLICATIONS

Extended European Search Report in counterpart European Patent Application No. 14811680.9, dated May 3, 2016 (10 pages).

* cited by examiner

FIG. 9

| | VISITED CELL IDENTIFIER | VISIT START TIME | VISIT ENDING TIME | VISIT TIME LENGTH |
|---|---|---|---|---|
| SE1 | Cc | 0 | 5 | 5 |
| SE2 | Ca | 5 | 15 | 10 |
| SE3 | Cb | 15 | NULL | NULL |

| | VISITED CELL IDENTIFIER | VISIT START TIME | VISIT ENDING TIME | VISIT TIME LENGTH |
|---|---|---|---|---|
| SE1 | Cc | 0 | 5 | 5 |
| SE2 | Ca | 5 | 15 -> 50 | 10 -> 45 |
| SE3 | Cb | 15 | 25 | 10 |

SI

CURRENT TIME (VISIT ENDING TIME)

50

| | VISITED CELL IDENTIFIER | VISIT START TIME | VISIT ENDING TIME | VISIT TIME LENGTH |
|---|---|---|---|---|
| SE1 | Cc | 0 | 5 | 5 |
| SE2 | Ca | 5 | 15 | 10 |
| SE3 | Cb | 15 | 25 | 10 |
| SE4 | Ca | 5 | NULL | NULL |

SI

| | VISITED CELL IDENTIFIER | VISIT START TIME | VISIT ENDING TIME | VISIT TIME LENGTH |
|---|---|---|---|---|
| SE1 | Cc | 0 | 5 | 5 |
| SE2 | Ca | 5 | 15 | 10 |
| SE3 | Cb | 15 | 25 | 10 |
| SE4 | Ca | 5 | NULL -> 50 | NULL -> 45 |

SI

CURRENT TIME (VISIT ENDING TIME)
50

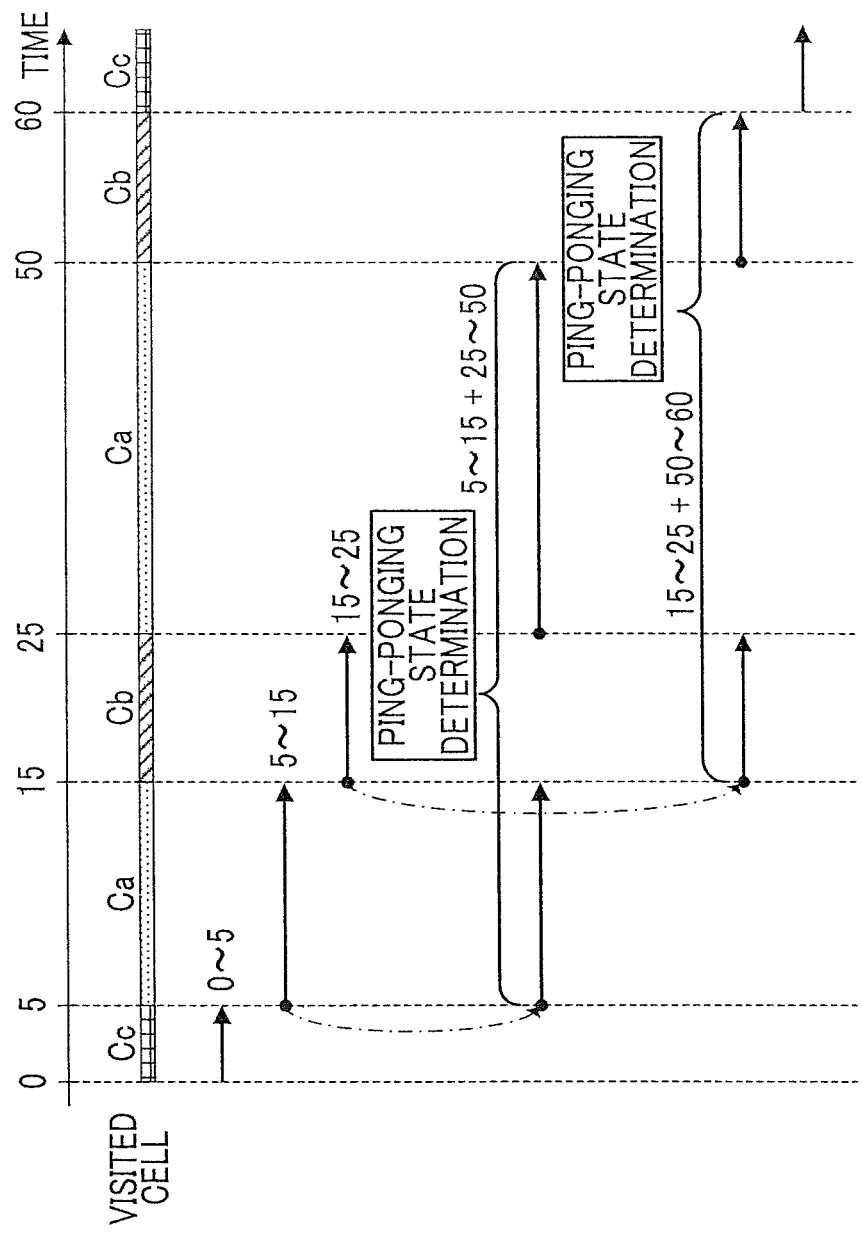

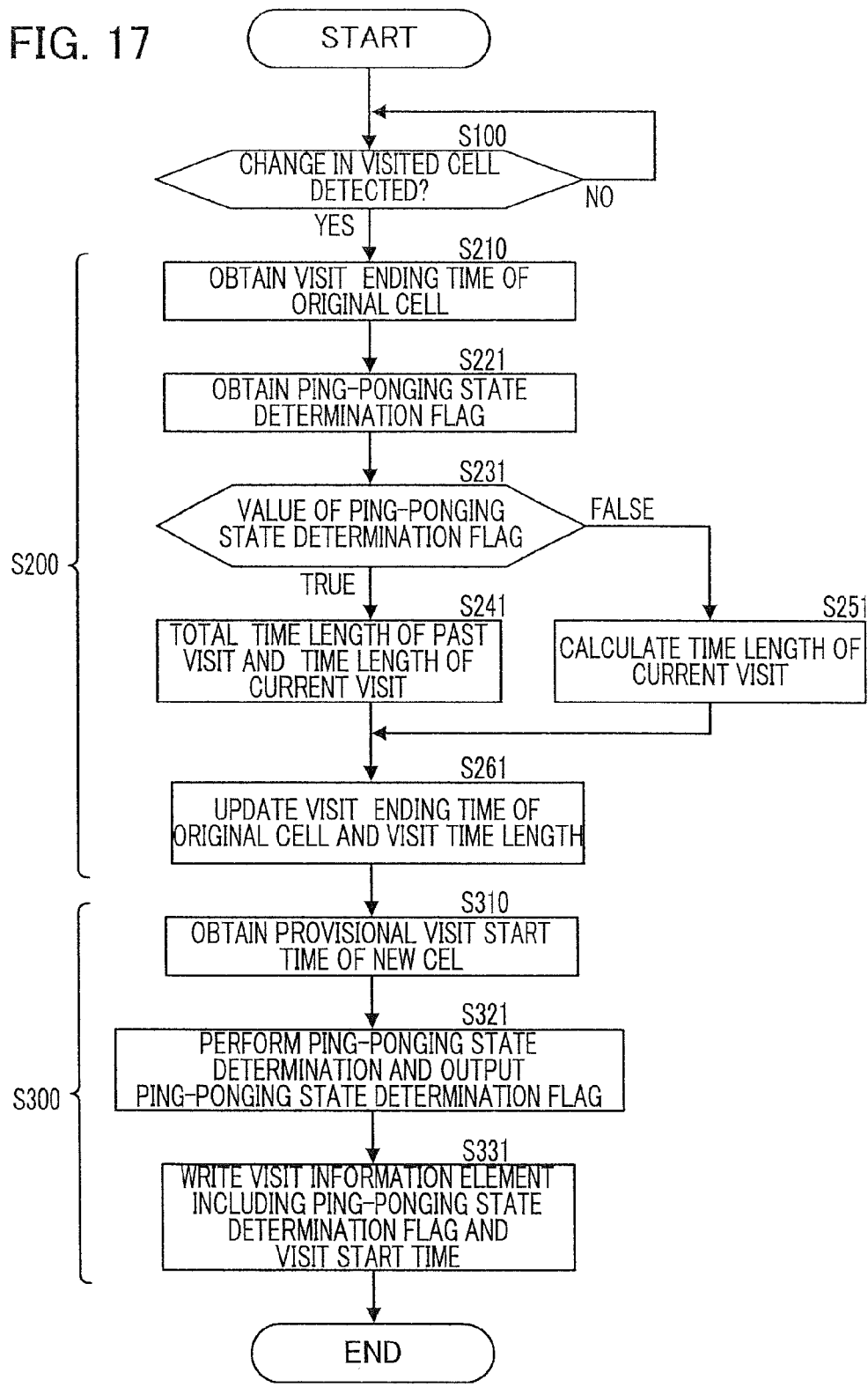

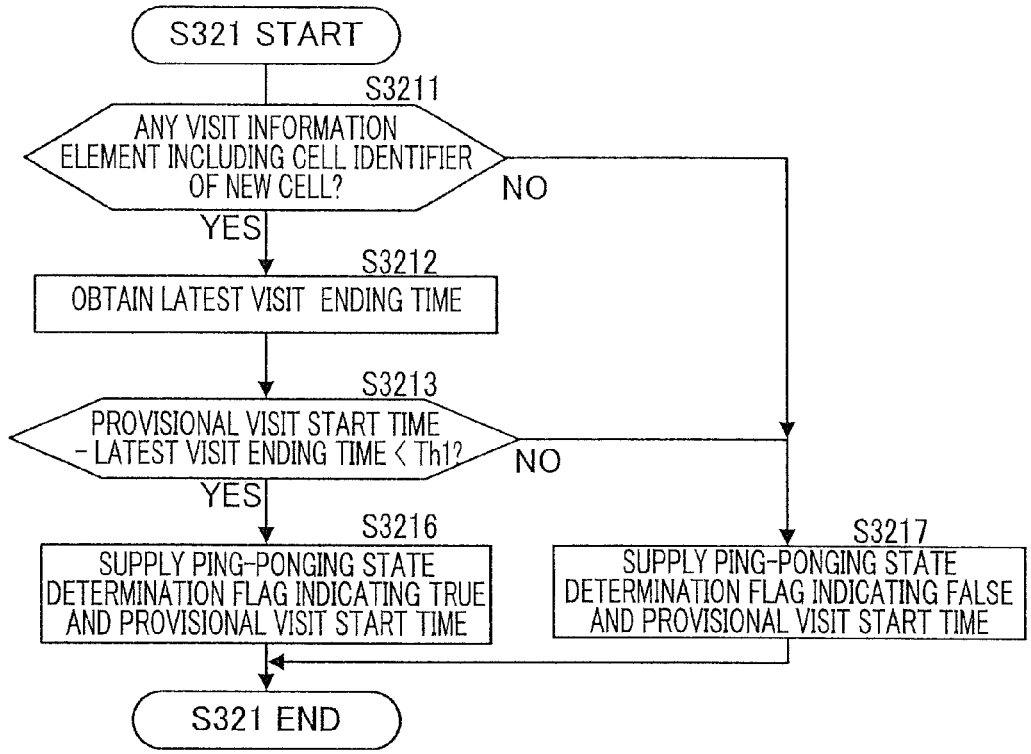

| | VISITED CELL IDENTIFIER | VISIT START TIME | VISIT ENDING TIME | VISIT TIME LENGTH | PING-PONGING STATE DETERMINATION FLAG |
|---|---|---|---|---|---|
| SE1 | Cc | 0 | 5 | 5 | F |
| SE2 | Ca | 5 | 15 | 10 | F |
| SE3 | Cb | 15 | 25 | 10 | F |
| SE4 | Ca | 25 | NULL -> 50 | NULL -> 35 | T |

SI

CURRENT TIME (VISIT ENDING TIME)

| | VISITED CELL IDENTIFIER | VISIT START TIME | VISIT ENDING TIME | VISIT TIME LENGTH | VIRTUAL CELL IDENTIFIER |
|---|---|---|---|---|---|
| SE1 | Cc | 0 | 5 | 5 | NULL |
| SE2 | Ca | 5 | 15 | 10 | Cx |
| SE3 | Cb | 15 | 25 | 10 | Cx |
| SE4 | Cx | 5 | 25 | 20 | NULL |

| | VISITED CELL IDENTIFIER | VISIT START TIME | VISIT ENDING TIME | VISIT TIME LENGTH | VIRTUAL CELL IDENTIFIER |
|---|---|---|---|---|---|
| SE1 | Cc | 0 | 5 | 5 | NULL |
| SE2 | Ca | 5 | 15 | 10 | Cx |
| SE3 | Cb | 15 | 25 | 10 | Cx |
| SE4 | Cx | 5 | 25 -> 50 | 20 -> 45 | NULL |

CURRENT TIME (VISIT_ENDING TIME)
50

RADIO COMMUNICATION SYSTEM AND COMMUNICATION CONTROL METHOD

TECHNICAL FIELD

The present invention relates to a radio communication system and to a communication control method.

BACKGROUND ART

A technique has recently been proposed which provides user equipment with information (e.g., advertisement information for a shop near the location) corresponding to a location of the user equipment. The locations of user equipments can be identified based on, for example, information measured by a GPS (Global Positioning System) or information from base stations, or both.

RELATED ART DOCUMENT

Patent Document

Patent Document 1: Japanese Patent Application Laid-Open Publication No. 2010-262484

SUMMARY OF THE INVENTION

Problem to be Solved by the Invention

It would be preferable to use not only a location of a user equipment but also the duration in which the user equipment remains in the location when selecting information provided for the user equipment. However, for user equipments that are located at cell edges (at the boundaries of cells), frequent changes in the visited cells (so called, "ping-ponging"), without the user equipments moving actually, sometimes occur. In a technique that identifies a location of a user equipment in accordance with a cell visited by the user equipment, the location of the user equipment is frequently changed due to ping-ponging, and the visit time length of a visit to the cell visited by the user equipment may possibly not be calculated appropriately.

In consideration of the abovementioned circumstance, the present invention has as an object to calculate more appropriately the time length of visits in cells visited by user equipments.

Means of Solving the Problems

A radio communication system of the present invention has: a visit information storage unit configured to store plural visit information elements each indicating information on a visit to a cell visited by a user equipment; a cell visit detector configured to detect that a user equipment that was visiting a first cell starts to visit a second cell differing from the first cell; a ping-ponging state determiner configured to determine whether a ping-ponging state has occurred, in which state start and ending of a visit to the second cell is repeated, and the determination is made based on a visit information element on the visit to the second cell visited by the user equipment; and a calculator configured to calculate a visit time length of the visit to the second cell in accordance with the determination by the ping-ponging state determiner.

In a preferred embodiment of the present invention, when the ping-ponging state determiner determines that the ping-ponging state has occurred, the calculator calculates the visit time length of the visit to the second cell so that the visit time length is longer than a visit time length of when the ping-ponging state determiner determines that the ping-ponging state has not occurred.

In a preferred embodiment of the radio communication system, the cell visit detector supplies a current time as a provisional visit start time of the second cell to the ping-ponging state determiner when the cell visit detector detects that the user equipment departs from the first cell and starts to visit the second cell, the ping-ponging state determiner supplies to the calculator, as a true visit start time, a visit start time indicated by a visit information element corresponding to the latest visit to the second cell from among the plural visit information elements stored in the visit information storage unit when the ping-ponging state determiner determines that the ping-ponging state has occurred, whereas the ping-ponging state determiner supplies to the calculator the provisional visit start time as a true visit start time when the ping-ponging state determiner determines that the ping-ponging state has not occurred, the calculator writes a new visit information element containing the true visit start time into the visit information storage unit when plural visit start times indicated by the plural visit information elements do not include the true visit start time, whereas the calculator does not write a new visit information element into the visit information storage unit when plural visit start times indicated by the plural visit information elements include the true visit start time, when the cell visit detector subsequently detects that the user equipment departs from the second cell and starts visiting another cell, the cell visit detector acquires a current time as a visit ending time of the second cell, to supply the current time to the calculator, and the calculator acquires a visit start time indicated by a visit information element corresponding to the latest visit to the second cell from among the plural visit information elements and calculates a difference between the visit start time and the visit ending time as the visit time length of the visit to the second cell.

In a preferred embodiment of the present invention, the ping-ponging state determiner determines that the ping-ponging state has occurred when a difference between a visit ending time and the provisional visit start time is below a threshold, the visit ending time being indicated by the visit information element corresponding to the latest visit to the second cell from among the plural visit information elements stored in the visit information storage unit, whereas the ping-ponging state determiner determines that the ping-ponging state has not occurred when the difference is above the threshold or when the visit information storage unit does not store a visit information element on the visit to the second cell.

In a preferred embodiment of the present invention, when the cell visit detector detects that the user equipment maintains the visit to the second cell, the cell visit detector acquires a current time as the visit ending time of the second cell, to supply the current time to the calculator, and the calculator acquires a visit start time indicated by the visit information element corresponding to the latest visit to the second cell from among the plural visit information elements stored in the visit information storage unit, to calculate a difference between the visit start time and the visit ending time as the visit time length of the visit to the second cell.

In a preferred embodiment of the present invention, the cell visit detector supplies a current time as a provisional visit start time to the ping-ponging state determiner when the cell visit detector detects that the user equipment departs from the first cell and starts to visit the second cell, the ping-ponging state determiner supplies to the calculator, as a true visit start time, a visit start time indicated by a visit information element corresponding to the latest visit to the second cell from among the plural visit information elements stored in the visit information storage unit when the ping-ponging state determiner determines that the ping-ponging state has occurred, whereas the ping-ponging state determiner supplies to the calculator the provisional visit start time as a true visit start time when the ping-ponging state determiner determines that the ping-ponging state has not occurred, the calculator writes a new visit information element containing the true visit start time supplied from the ping-ponging state determiner into the visit information storage unit, when the cell visit detector subsequently detects that the user equipment departs from the second cell and starts visiting another cell, the cell visit detector acquires a current time as a visit ending time of the second cell, to supply the current time to the calculator, the calculator acquires a visit start time indicated by an incomplete visit information element corresponding to the visit to the second cell and not containing a visit ending time, from among the plural visit information elements stored in the visit information storage unit, to calculate, as the visit time length of the visit to the second cell, a difference between the visit start time and the visit ending time supplied from the cell visit detector.

In a preferred embodiment of the present invention, the ping-ponging state determiner determines that the ping-ponging state has occurred when a frequency of visits to the second cell indicated by the plural visit information elements stored in the visit information storage unit is above a threshold, whereas the ping-ponging state determiner determines that the ping-ponging state has not occurred when the frequency is below the threshold or when the visit information storage unit does not store a visit information element on the visit to the second cell.

In a preferred embodiment of the present invention, the cell visit detector supplies a current time as a provisional visit start time of the second cell to the ping-ponging state determiner when the cell visit detector detects that the user equipment departs from the first cell and starts to visit the second cell, the ping-ponging state determiner determines that the ping-ponging state has occurred when a difference between a visit ending time and the provisional visit start time is below a threshold, the visit ending time being indicated by a visit information element corresponding to the latest visit to the second cell from among the plural visit information elements stored in the visit information storage unit, and supplies a ping-ponging state determination flag indicating TRUE and the provisional visit start time to the calculator, whereas the ping-ponging state determiner determines that the ping-ponging state has not occurred when the difference is above the threshold or when the visit information storage unit does not store a visit information element on the visit to the second cell, and supplies a ping-ponging state determination flag indicating FALSE and the provisional visit start time to the calculator, the calculator writes, into the visit information storage unit, a new visit information element containing the ping-ponging state determination flag and the provisional visit start time as the visit start time, the ping-ponging state determination flag and the provisional visit start time being supplied from the ping-ponging state determiner, when the cell visit detector subsequently detects that the user equipment departs from the second cell and starts visiting another cell, the cell visit detector acquires a current time as a visit ending time of the second cell, to supply the current time to the calculator, and the calculator acquires the ping-ponging state determination flag indicated by the new visit information element corresponding to the latest visit to the second cell from among the plural visit information elements stored in the visit information storage unit, and when the ping-ponging state determination flag indicates TRUE, to calculate a sum of a visit time length and a difference as the visit time length of the visit to the second cell, and the visit time length is indicated by a visit information element that corresponds to a visit to the second cell immediately before the visit corresponding to the new visit information element, and the difference is a difference between a visit start time indicated by the new visit information element and the visit ending time, whereas, when the ping-ponging state determination flag indicates FALSE, the calculator calculates, as the visit time length of the visit to the second cell, a difference between a visit start time indicated by the new visit information element and the visit ending time.

In a preferred embodiment of the present invention, the cell visit detector supplies a current time as a provisional visit start time to the ping-ponging state determiner when the cell visit detector detects that the user equipment departs from the first cell and starts to visit the second cell, the ping-ponging state determiner, when it determines that the ping-ponging state has occurred, assigns a virtual cell identifier to a plurality of cells including the second cell that are involved in the ping-ponging state, stores a visit information element having the virtual cell identifier in the visit information storage unit, sets, as a true visit start time, a visit start time indicated by a visit information element that corresponds to the latest visit corresponding to the virtual cell identifier, and supplies the virtual cell identifier and the true visit start time to the calculator, the ping-ponging state determiner, when it determines that the ping-ponging state has not occurred, sets the provisional visit start time as a true visit start time, and supplies a cell identifier of the second cell and the true visit start time to the calculator. When one or more visit start times indicated by one or more visit information elements corresponding to the virtual cell identifier or the cell identifier of the second cell supplied from the ping-ponging state determiner do not include the true visit start time, the calculator writes a new visit information element containing the true visit start time and the supplied virtual cell identifier or the cell identifier of the second cell into the visit information storage unit, whereas the calculator does not write a new visit information element into the visit information storage unit when one or more visit start times indicated by one or more visit information elements corresponding to the supplied virtual cell identifier or the cell identifier of the second cell include the true visit start time, when the cell visit detector subsequently detects that the user equipment departs from the second cell and starts visiting another cell, the cell visit detector acquires a current time as a visit ending time of the second cell, to supply the current time to the calculator, and the calculator acquires a visit start time indicated by a visit information element that corresponds to the latest visit from among visit information elements corresponding to the virtual cell identifier corresponding to the second cell, to calculate a difference between the visit start time and the visit ending time as the visit time length of the visit to the second cell.

A communication control method of the present invention includes: storing plural visit information elements each indicating information on a visit to a cell visited by a user equipment; detecting that the user equipment that was visiting a first cell starts a visit to a second cell differing from the first cell; determining whether a ping-ponging state has occurred, in which state start and ending of a visit to the second cell is repeated, and the determination is made based on a visit information element on a visit to the second cell visited by the user equipment; and calculating a visit time length of the visit to the second cell in accordance with the determination of the ping-ponging state.

Effect of the Invention

The present invention enables a more appropriate calculation of a time length of visit to a cell by a user equipment.

BRIEF DESCRIPTION OF THE DRAWINGS

FIG. 9 is a configuration example of visit information stored in a storage unit.
FIG. 10 is a configuration example of visit information stored in the storage unit.
FIG. 16 is a schematic diagram showing an update operation of a visit time length according to a fourth embodiment.
FIG. 17 is a flowchart of an update operation of the visit time length according to the fourth embodiment.
FIG. 18 is a flowchart of a detailed operation performed in Step S321 of the flowchart of FIG. 17.
FIG. 19 is a configuration example of visit information stored in the storage unit.
FIG. 24 is a configuration example of visit information stored in the storage unit.
FIG. 25 is a configuration example of visit information stored in the storage unit.

MODES FOR CARRYING OUT THE INVENTION

1. First Embodiment

1(1). Overview of Radio Communication System

Figure 1:
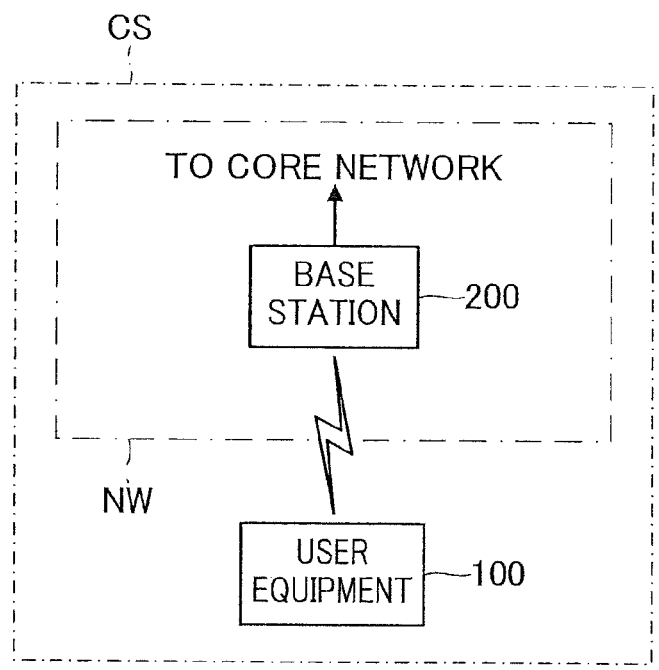
FIG. 1 is a block diagram illustrating a radio communication system according to a first embodiment.

FIG. 1 is a block diagram illustrating a radio communication system CS according to a first embodiment of the present invention. The radio communication system CS has, as its elements, a user equipment 100 and a base station 200. The base station 200 is connected to a core network provided with a switching center and a gateway, which are elements other than those shown in the figure. A network NW has the elements except for the user equipment 100 from among the above elements provided in the radio communication system CS.

Each element of the radio communication system CS executes communication in accordance with a freely selected access technology. One such example that can be employed as an access technology is an LTE/SAE (Long Term Evolution/System Architecture Evolution) standard contained in the 3GPP (Third Generation Partnership Project) standard. Multiple radio access systems that are usable include a frequency division multiple access and a time division multiple access. In the radio communication system CS, plural radio access technologies (for example, 3G and LTE) may be employed.

Figure 2:
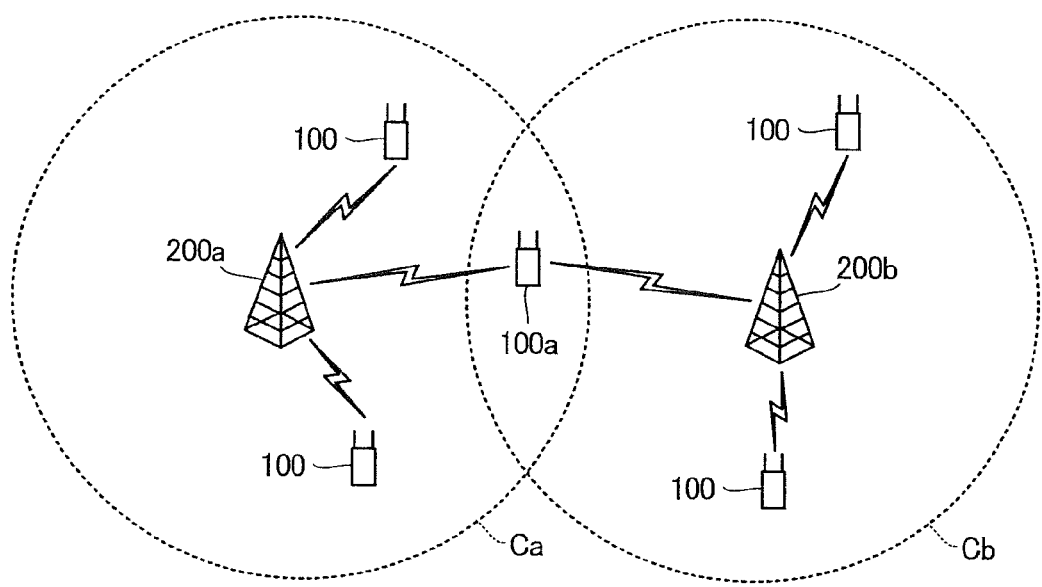
FIG. 2 is a diagram illustrating cells formed by base stations according to the first embodiment.

As shown in FIG. 2, the base stations 200 (200a and 200b) have cells C (Ca and Cb) formed therearound. Each cell C is identified by a unique cell identifier. User equipments 100 each are able to communicate by radio with a base station 200 that corresponds to a cell C that each user equipment 100 visits (is currently located at). One base station 200 may form plural cells C. A radio access technology used in each cell C may be freely selected. For example, the same radio access technology may be used across plural cells C formed by one base station 200, or different radio access technologies may be used.

In FIG. 2, a user equipment 100a is located in both the cell Ca and the cell Cb. Since the radio communication environment changes in each moment, a cell C (for example, a cell C for which the user equipment 100a has the highest reception power) that the user equipment 100a is visiting changes in each moment. Such frequent changes in the visited cells, without the user equipment 100a moving significantly, is generally called "ping-ponging" or "fluttering".

As described above, it should be preferable to use also the time length (visit time length) of a duration in which a user equipment 100 remains in a visited location when providing information corresponding to the location of the user equipment 100. However, due to frequent changes in visited cells, called "ping-ponging", calculating the visit time length appropriately is sometimes not possible. For example, in a circumstance shown in FIG. 2, when the visited cell of the user equipment 100a which is not moving changes every minute from one to the other between the cell Ca and the cell Cb, the duration of visit in each of the cell Ca and the cell Cb is cut short (with a duration of a minute) even though the user equipment 100a is located in the same location for a longer period.

In the present embodiment, the duration of a visit to the cell C is calculated to be longer when ping-ponging has occurred than the duration of the visit when ping-ponging has not occurred. A specific configuration will be described below.

1(2). Configuration of Each Element

1(2)-1. Configuration of User Equipment

Figure 3:
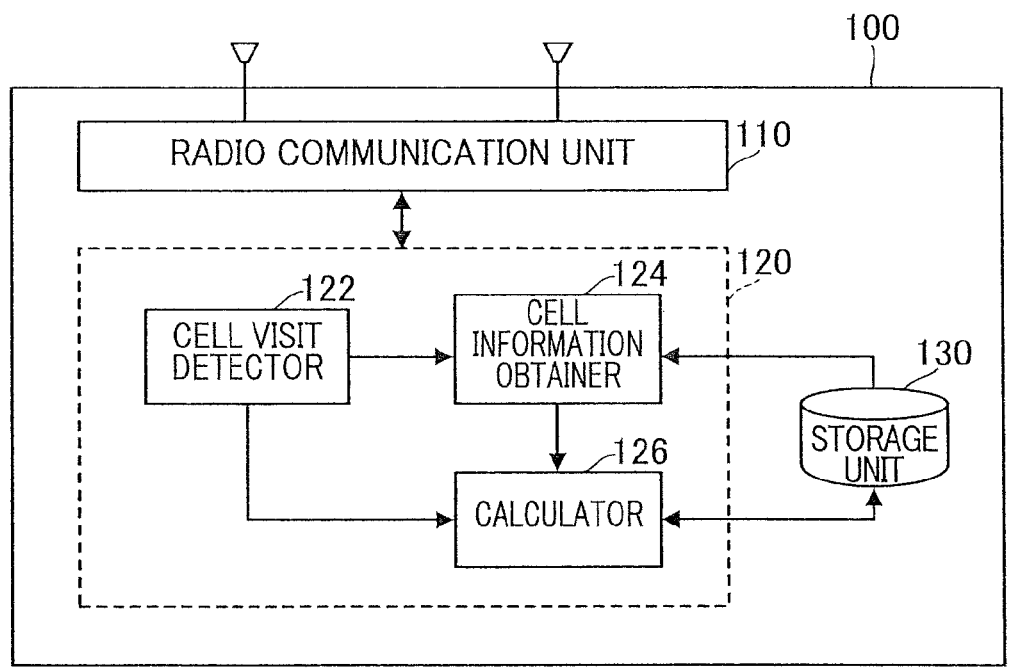
FIG. 3 is a block diagram illustrating a configuration of a user equipment according to the first embodiment.

FIG. 3 is a block diagram illustrating a configuration of the user equipment 100 according to the first embodiment. The user equipment 100 has a radio communication unit 110, a controller 120, and a storage unit 130. An output device for outputting speech, video, etc. and an input device for receiving instructions from a user are not shown for the sake of convenience. The radio communication unit 110 is an element for executing radio communication with the base stations 200, and includes a transmitter-receiver antenna, a reception circuit for receiving downlink radio signals from each of the base stations 200 for conversion into electric signals, and a transmission circuit for converting electric signals such as control signals and user signals into uplink radio signals. The storage unit 130 stores information (visit information SI) on communication control, in particular, information on a visit to a cell visited by the user equipment 100. The storage unit 130 thus can serve as a visit information storage unit. The visit information SI includes plural visit information elements SE, which will be described later in detail.

The controller 120 has a cell visit detector 122, a ping-ponging state determiner 124, and a calculator 126. The cell visit detector 122 detects that the user equipment 100 departs from a currently visited cell C (original cell) and starts to visit a cell C (new cell). The ping-ponging state determiner 124 determines whether a ping-ponging state involving highly frequent repetition of starts and ends of a visit to a cell has occurred based on the visit information elements SE stored in the storage unit 130. The calculator 126 calculates a time length (visit time length) of a duration during which the user equipment 100 remains in a cell in accordance with the above ping-ponging state determination by the ping-ponging state determiner 124. Operations of each element in the controller 120 will be described later in more detail. The controller 120 and each element in the controller 120 are functional blocks implemented by a CPU (not shown) of the user equipment 100 executing a computer program stored in the storage unit 130 and functioning in accordance with the computer program.

1(2)-2. Configuration of Base Station

Figure 4:
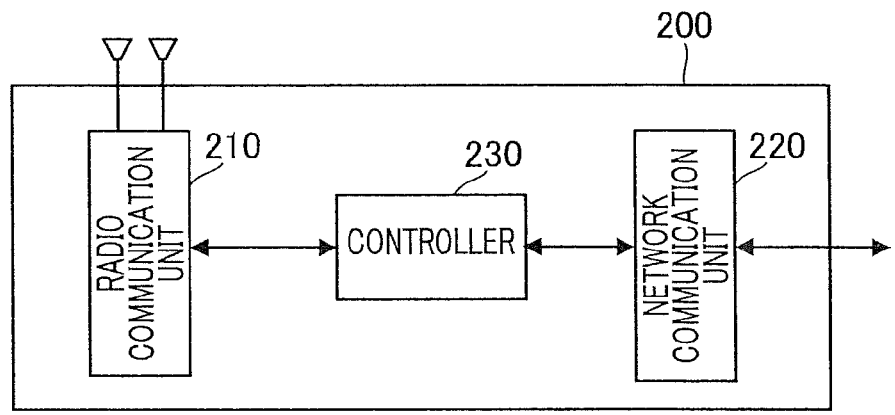
FIG. 4 is a block diagram illustrating a configuration of a base station according to the first embodiment.

FIG. 4 is a block diagram illustrating a configuration of the base station 200 according to the first embodiment. The base station 200 has a radio communication unit 210, a network communication unit 220, and a controller 230. The radio communication unit 210 is an element for executing radio communication with the user equipments 100, and is configured in substantially the same manner as the radio communication unit 110 of the user equipment 100. The network communication unit 220 is an element that executes wired communication with other nodes (other base stations 200, switching centers, gateways, etc.) in the network NW. The controller 230 transmits or receives, via the radio communication unit 210 and the network communication unit 220, signals (control signals, data signal, etc.) to and from the user equipments 100 and other nodes in the network NW. The controller 230 is a functional block implemented by a CPU (not shown) of the base station 200 executing a computer program stored in a storage unit (not shown) and functioning in accordance with the computer program.

1(3). Update Operation of Visit Time Length

1(3)-1. Overview

In the following, a calculation operation of the time length of visit according to the present embodiment will be described. To give an overview, when it is determined that the user equipment 100 is in a ping-ponging state, the visit start time of a visit to the cell C is changed from a real visit start time ("provisional visit start time" described later) to a past visit start time of a visit to the cell C, for calculation of the visit time length.

Figure 5:
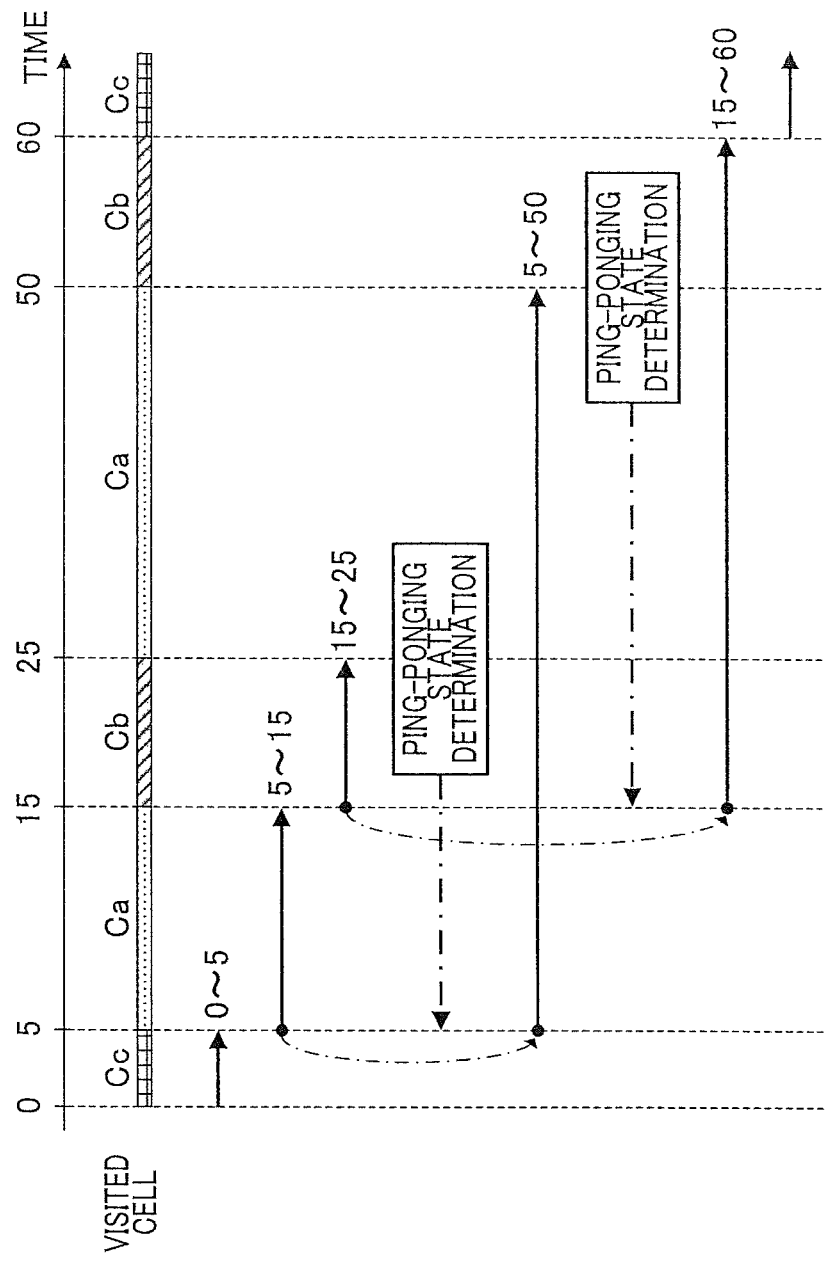
FIG. 5 is a schematic diagram illustrating an update operation of a visit time length according to the first embodiment.

FIG. 5 is a schematic diagram illustrating an update operation of the visit time length according to the present embodiment. In the following, the operation will be described in chronological order. The user equipment 100 starts to visit a cell Cc at time t=0. The user equipment 100 ends the visit to the cell Cc at time t=5 and starts to visit the cell Ca. At this point (t=5), the user equipment 100 (the calculator 126) calculates the visit time length of the visit to the cell Cc to be "5". The user equipment 100 ends the visit to the cell Ca at time t=15 and starts to visit the cell Cb. At this point (t=15), the visit time length of the visit to the cell Ca is calculated to be "10". The above is an operation in a case in which a ping-ponging state has not occurred.

The user equipment 100 ends the visit to the cell Cb at time t=25 and starts to again visit the cell Ca. The user equipment 100 (the ping-ponging state determiner 124) determines that a ping-ponging state has occurred with respect to the cell Ca based on a difference d (d=10) between the visit ending time (t=15) of the previous visit (the latest among the past visits) to the cell Ca and the visit start time (t=25) of this time to the same cell being below a threshold Th1 (Th1=60 in the example shown in FIG. 5). The user equipment 100 (the calculator 126) sets a true visit start time to be the start time (t=5) of the previous visit to the cell Ca, not the visit start time (provisional visit start time) of the current visit, based on the above ping-ponging state determination. Subsequently, the user equipment 100, upon ending the visit to the cell Ca at time t=50, uses the true visit start time (t=5) and the visit ending time (t=50), to calculate the visit time length (L=45) of the visit to the cell Ca. The above is an operation in a case in which a ping-ponging state has occurred. At time t=50 and time t=60, an update operation that is substantially similar to the above is performed with respect to the cell Cb, with consideration to the ping-ponging.

1(3)-2. Details of Update Operation

Figure 6:
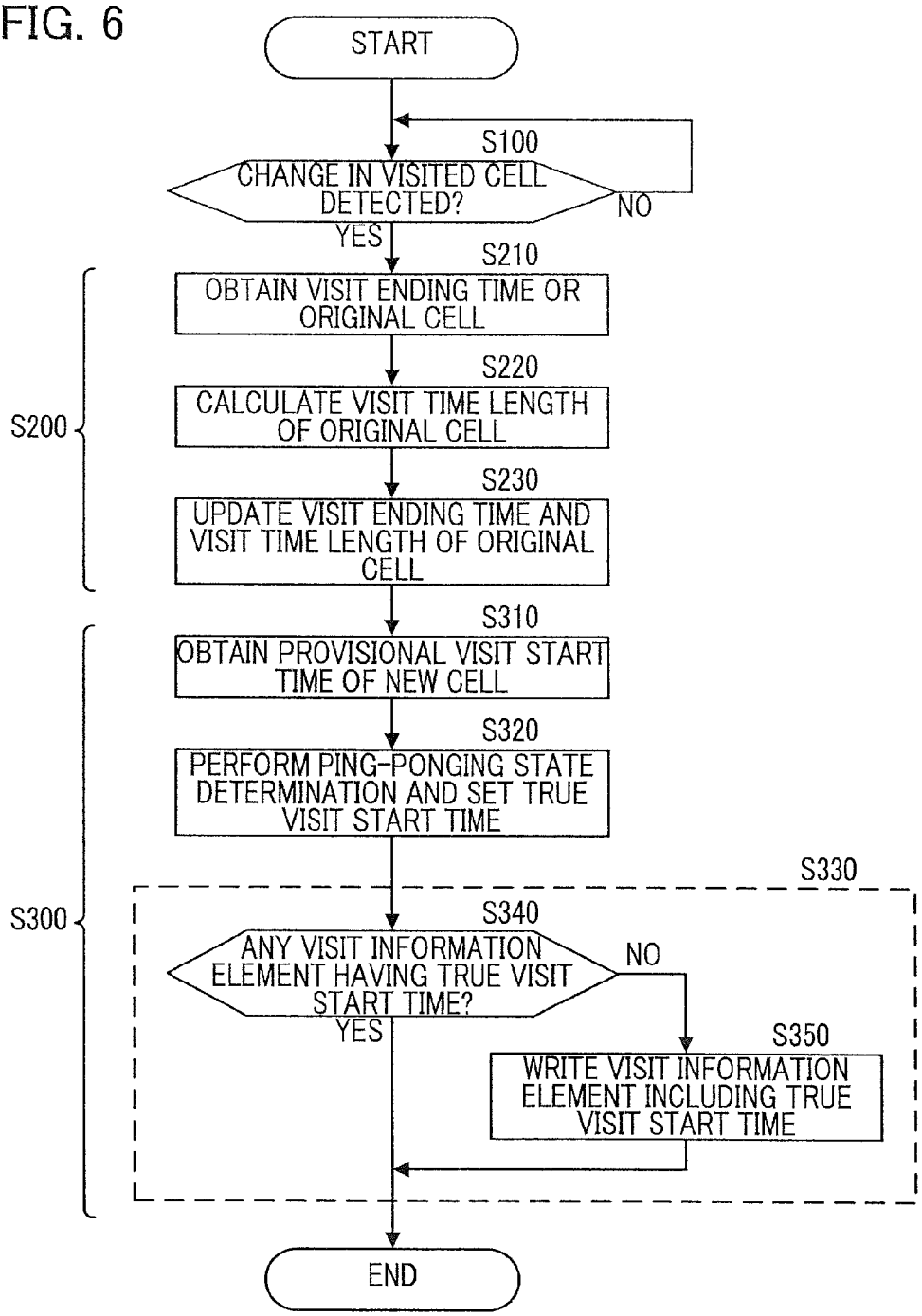
FIG. 6 is a flowchart of an update operation of the visit time length according to the first embodiment.
Figure 7:
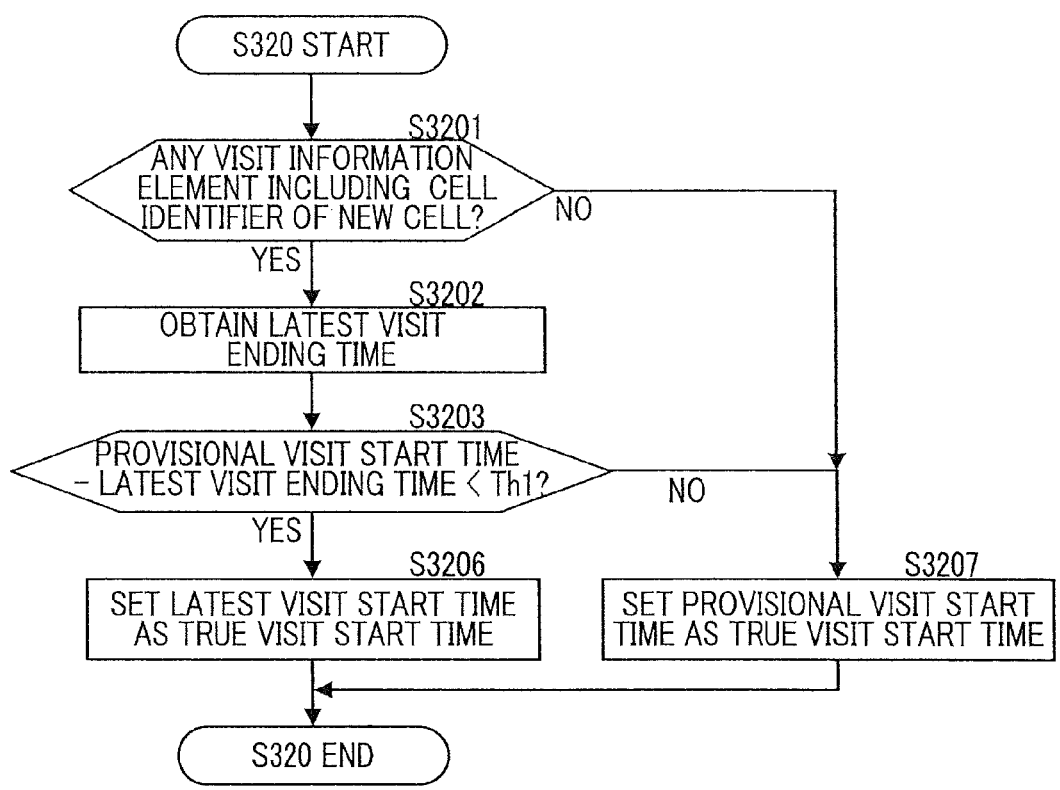
FIG. 7 is a flowchart of a detailed operation performed in Step S320 of the flowchart of FIG. 6.
Figure 8:
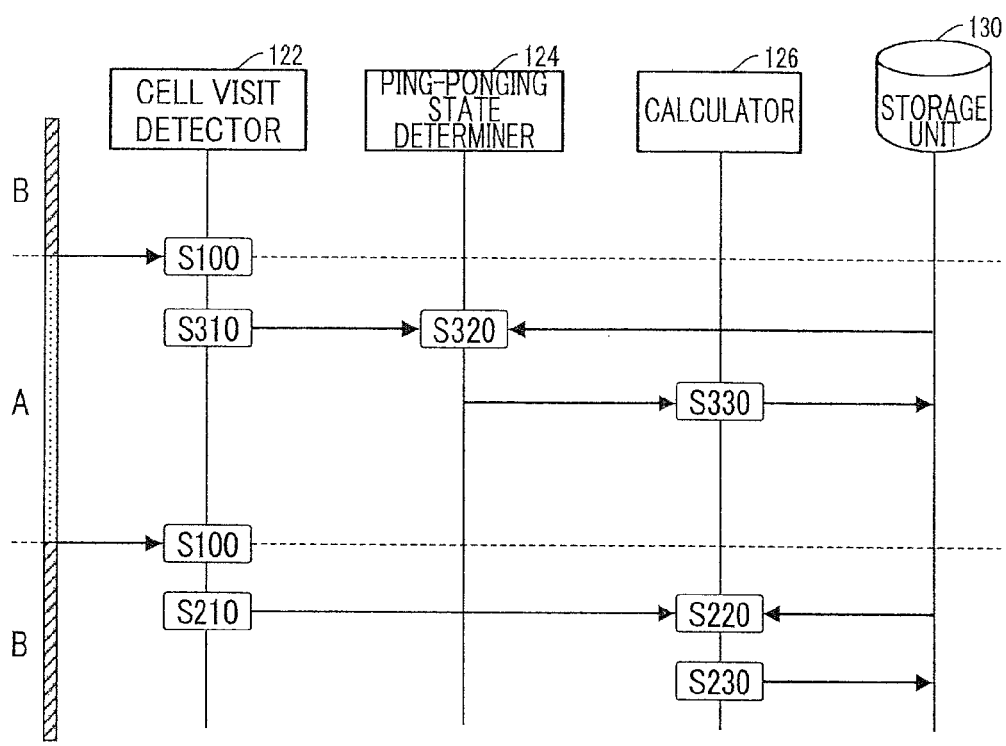
FIG. 8 is a schematic diagram illustrating flow of information in an update operation of the visit time length according to the first embodiment.

FIGS. 6 to 10 will be referred to, to provide a more detailed explanation of the update operation of the visit time length. FIG. 6 is a flowchart of an update operation of the visit time length according to the present embodiment. FIG. 7 is a flowchart of a detailed operation performed in Step S320 of the flowchart of FIG. 6. FIG. 8 is a schematic diagram illustrating flow of information in the update operation of the visit time length according to the present embodiment. FIGS. 9 and 10 illustrate configurations of the visit information SI stored in the storage unit 130. The visit information SI includes plural visit information elements SE (SE1, SE2, SE3, . . . ) each indicating information on a visit to the cell C visited by the user equipment 100.

The update operation of the visit time length is roughly divided into three stages. The first stage (S100) is executed by the cell visit detector 122 and is a process of determining whether a change in a visited cell is detected. The second stage (S200) is a process of calculating a visit ending time and a visit time length with respect to a visited cell (called the "original cell"), which is a cell visited before the visited cell is changed. The third stage (S300) is a process of performing the ping-ponging state determination with respect to a visited cell (called the "new cell"), which is a cell after the visited cell changes, to decide on a true visit start time. As shown in FIGS. 6 and 7, Step S200 includes Steps from S210 to S230, and Step S300 includes Steps from S310 to S350.

As described above, the visit ending process (S200) with respect to the original cell and the visit start process (S300) with respect to the new cell are performed when a visited cell is changed. When a focus is placed on a cell C (Ca), a series of processes is completed through the visit start process (S300) and then the visit ending process (S200) resulting from a change to a newly visited cell, as shown in FIG. 8. In the following, description of the visit start process will first be given, and the description on the visit ending process follows thereafter, with respect to the cell Ca. The time series described with reference to FIG. 5 will be used to describe an operation at time t=25 which is the start of a visit to the cell Ca and at time t=50 which is the ending of the visit to the cell Ca.

At time t=25, the cell visit detector 122, when it detects that the user equipment 100 departs from the cell Cb (original cell) to start visiting the cell Ca (new cell) (S100; YES), obtains the current time (t=25) as a provisional visit start time of the visit to the cell Ca, to supply the current time to the ping-ponging state determiner 124 (S310). In a case in which no change in the cell that is visited is detected, a detection loop is repeated by the cell visit detector 122 (S100; NO). Description of the process (S200) with respect to the cell Cb is omitted.

When a change in a visited cell is detected, the ping-ponging state determiner 124 determines whether a ping-ponging state has occurred, to set a true visit start time (S320). The detail of Step S320 will be described with reference to FIG. 7. The ping-ponging state determiner 124 determines whether any visit information element SE containing the cell identifier of the cell Ca is included in the visit information SI (S3201). The ping-ponging state determiner 124, from among such one or more visit information element or elements SE, obtains a visit ending time that corresponds to the latest visit to the cell Ca (i.e., that has the greatest value as the visit ending time) (S3202).

In the example of FIG. 9, the visit ending time (t=15) indicated by a visit information element SE2 that corresponds to the latest visit to the cell Ca is obtained. At this point, no visit information element SE for the currently visited cell Ca is written in the visit information SI.

The ping-ponging state determiner 124 determines whether a difference d (d=10) between the provisional visit start time supplied from the cell visit detector 122 and the visit ending time obtained in Step S3202, is below the threshold Th1 (Th1=60) (S3203). In this example, since the difference d is below the threshold Th1 (S3203; YES), the ping-ponging state determiner 124 determines that a ping-ponging state has occurred. The ping-ponging state determiner 124 then sets, as the true visit start time, the visit start time (t=5) indicated by the visit information element SE2 that corresponds to the latest visit to the cell Ca to supply the true visit start time to the calculator 126 (S3206).

When no visit information element SE containing the cell identifier of the cell Ca is included in the visit information SI (S3201; NO), or the difference d is above the threshold Th1 (S3203; NO), the ping-ponging state determiner 124 determines that no ping-ponging state has occurred. In this case, the ping-ponging state determiner 124 sets the true visit start time to be the provisional visit start time supplied from the cell visit detector 122, to supply the true visit start time to the calculator 126 (S3207).

FIG. 6 is again referred to, to continue the explanation. The calculator 126 determines whether the visit information SI includes any visit information element SE that has the true visit start time supplied from the ping-ponging state determiner 124 (S340). When the visit information SI does not include any visit information element SE that has the true visit start time (S340; NO), the calculator 126 writes a new visit information element SE including the cell identifier of the new cell and the true visit start time into the visit information SI (the storage unit 130) (S350). On the other hand, when the visit information SI includes a visit information element SE that has the true visit start time (S340; YES), the calculator 126 does not write a new visit information element SE into the visit information SI.

In this example, since the visit information SI includes the visit information element SE2 having the true visit start time (t=5), the calculator 126 does not write a new visit information element SE. As a result, the visit information element SE2 having the true visit start time (t=5) is maintained as a visit information element SE that corresponds to the latest visit to the cell Ca.

Subsequently, at time t=50, the cell visit detector 122, when it detects that the user equipment 100 departs from the cell Ca (original cell) to start visiting the cell Cb (new cell) (S100; YES), obtains the current time (t=50) as a visit ending time of the visit to the cell Ca, to supply the visit ending time to the calculator 126 (S210). Description on the process (S300) with respect to the cell Cb is omitted.

The calculator 126 acquires the visit start time (t=5) indicated by the visit information element SE2 corresponding to the latest visit to the cell Ca and calculates a difference between the visit start time and the visit ending time (t=50) obtained in Step S210 as the visit time length (L=45) of the visit to the cell Ca (S220). The calculator 126 writes, as shown in FIG. 10, the visit ending time (t=50) and the visit time length (L=45) into the visit information element SE2 (S230).

The above update operation of Step S200 is executed in the same manner even if a visit information element SE does not store the visit ending time and the visit time length.

1(4). Effects of the Present Embodiment

With the above configuration, when a ping-ponging state has occurred, even if a visit to a new cell has started, a new visit information element SE corresponding to the new cell (having the cell identifier of the new cell) is not written into the storage unit 130. When the visit to the new cell ends subsequently, the visit ending time and the visit time length of the latest visit information element SE from among visit information elements SE that correspond to the new cell are updated. In other words, when a ping-ponging state has occurred, a visit start time of the visit to the new cell is maintained without being updated.

2. Second Embodiment

In the following, description will be given of a second embodiment according to the present invention. In each embodiment illustrated below, the same reference numerals and signs will be used for those elements for which actions and elements are the same as those of the first embodiment, and description thereof will be omitted where appropriate.

2(1). Detail of Update Operation

Figure 11:
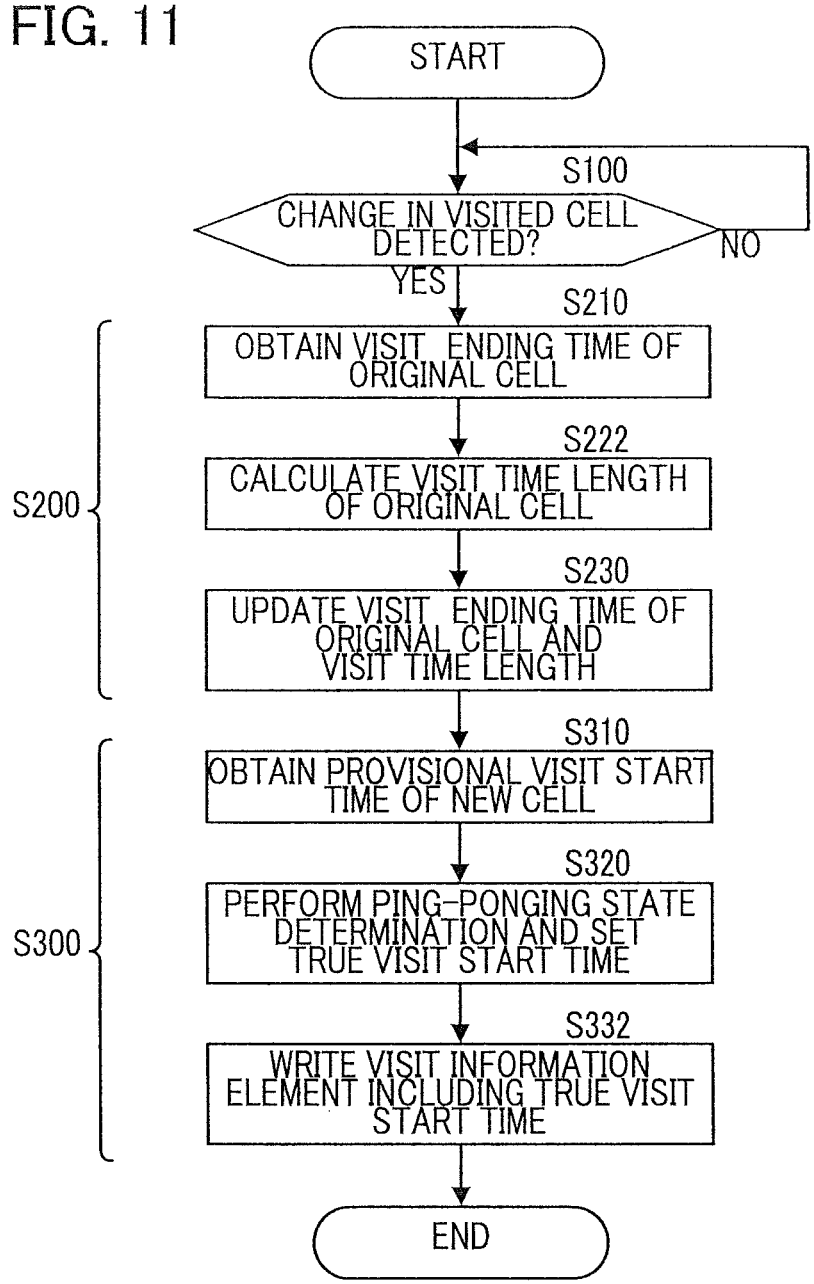
FIG. 11 is a flowchart of an update operation of visit time length according to a second embodiment.

With reference to FIG. 11, an update operation according to the present embodiment will be described in detail. Like in the first embodiment, description on the visit start process (S300) will first be given, and the description on the visit ending process (S200) follows thereafter. The time series described with reference to FIG. 5 will also be used in the following explanation.

Figures 12, 13:
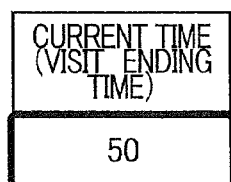
FIG. 12 is a configuration example of visit information stored in the storage unit.
FIG. 13 is a configuration example of visit information stored in the storage unit.

The user equipment 100 starts to visit a cell Ca at time t=25. In the visit start process, Steps S100, S310, and S320 are performed in substantially the same ways as those in the first embodiment. Therefore, like in the first embodiment, the visit start time (t=5) indicated by the visit information element SE2 that corresponds to the latest visit to the cell Ca will be the true visit start time. The calculator 126 writes a new visit information element SE4 including the cell identifier of the cell Ca and the true visit start time supplied from the ping-ponging state determiner 124 into the visit information SI (the storage unit 130) (S332). FIG. 12 shows the visit information SI after the new visit information element SE4 was written therein.

Unlike in the first embodiment, the calculator 126 writes a visit information element SE every time the user equipment 100 starts to visit the cell C. The visit information element SE written is one (incomplete visit information element) that has the cell identifier and a visit start time, but does not have a visit ending time or a visit time length.

The user equipment 100 subsequently ends the visit to the cell Ca at time t=50. In the visit ending process, Steps S100 and S210 are performed in substantially the same ways as those in the first embodiment. The calculator 126 obtains the visit start time (t=5) indicated by the visit information element SE4 (incomplete visit information element), which corresponds to a visit to the new cell Ca and does not include a visit ending time, from among the plural visit information elements SE included in the visit information SI. The calculator 126 calculates a difference between the visit start time and the visit ending time (t=50) supplied in Step S210 as the visit time length (L=45) of the visit to the cell Ca (S222). The calculator 126 writes, as shown in FIG. 13, the visit ending time (t=50) and the visit time length (L=45) into the visit information element SE4 (S230).

2(2). Modification of Ping-Ponging State Determination

Figure 14:
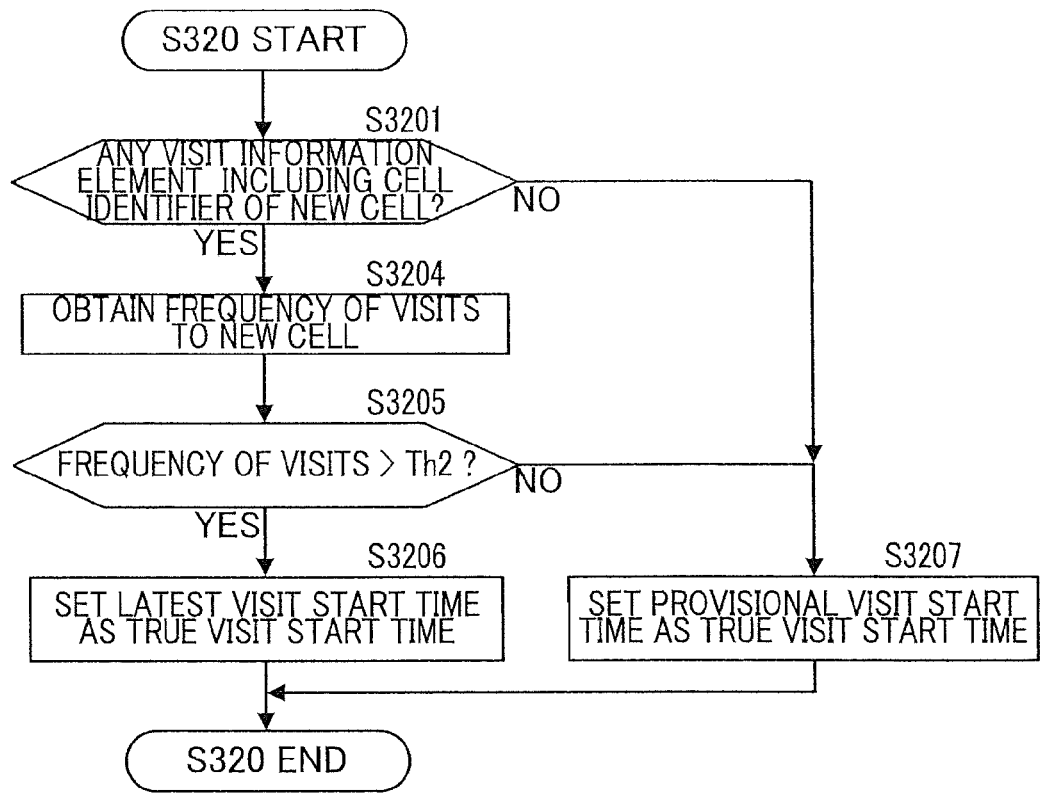
FIG. 14 is a flowchart illustrating a modification of ping-ponging state determination.

The present embodiment may employ a freely selected criterion for ping-ponging state determination. FIG. 14 is a flowchart illustrating a modification of Step S320 (FIG. 7) including the ping-ponging state determination. In the present modification, Steps S3202 and S3203 of FIG. 7 are replaced by new Steps S3204 and S3205. The ping-ponging state determiner 124 obtains frequency of visits to the cell Ca indicated by plural visit information elements SE contained in the visit information SI. A value employed as the "frequency of visits" is freely selected. For example, a value such as the number of visits to the new cell (cell Ca) within the last 10 minutes and the number of visits to the new cell (cell Ca) from among the latest n-time changes in a visited cell can be employed as the "frequency of visits". The ping-ponging state determiner 124 determines that the ping-ponging state has occurred when the frequency of visits to the cell Ca is above a threshold Th2 (S3205; YES). The ping-ponging state determiner 124 determines that no ping-ponging state has occurred when the frequency of visits to the cell Ca is below the threshold Th2 or when the visit information SI does not include a visit information element SE for the visit to the cell Ca (S3205; NO). The subsequent operation is the same as described above.

2(3). Effects of the Present Embodiment

With the above configuration, when a ping-ponging state has occurred and a visit to a new cell has started, the visit start time of a visit information element SE that is the latest from among visit information elements SE that correspond to the new cell is written as a visit start time of a new visit information element SE (incomplete visit information element) corresponding to the new cell. The same effects as the first embodiment can be attained.

3. Third Embodiment

The above embodiments implement the update operation when a cell visited by the user equipment 100 changes. The present embodiment additionally implements the update operation also when a cell visited by the user equipment 100 does not change.

3(1). Update Operation when Visited Cell does not Change

Figure 15:
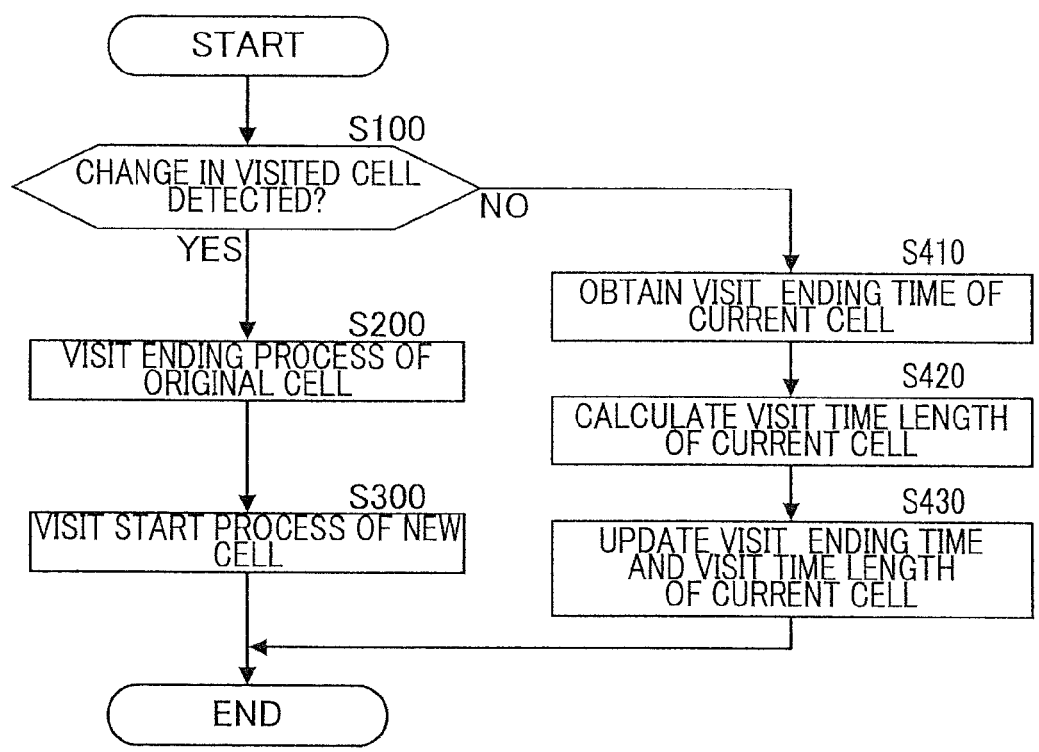
FIG. 15 is a flowchart of an update operation of a visit time length according to a third embodiment.

With reference to FIG. 15, an update operation according to the present embodiment will be described. The present embodiment assumes that the user equipment 100 maintains the visit to the cell Ca. When the cell visit detector 122 detects that the user equipment 100 maintains the visit to the cell Ca (i.e., does not detect a change of the visited cell Ca) (S100; NO), the cell visit detector 122 obtains a current time as a visit ending time of the current cell Ca, to supply the current time to the calculator 126 (S410). When the change of the visited cell Ca is detected, the operation will be substantially the same as that of the first embodiment or of the second embodiment, and therefore, description thereof is omitted.

The calculator 126 acquires a visit start time indicated by one of the visit information elements SE that corresponds to the latest visit to the cell Ca and calculates a difference between the visit start time and the visit ending time obtained in Step S410 as the visit time length of the visit to the cell Ca (S420). The calculator 126 writes the visit ending time and the visit time length into the visit information element SE (S430).

3(2). Effects of the Present Embodiment

With the configuration above, since the visit time length will be updated regardless of the change in the visited cell, the visit time length of a visit to the cell C by the user equipment 100 can be more appropriately calculated even when the visited cell is not changed for a considerable period.

4. Fourth Embodiment

4(1). Update Operation Using Ping-Ponging State Determination Flag

4(1)-1. Overview

In the following, an update operation of the visit time length according to the present embodiment will be described.

To give an overview, when it is determined that the user equipment 100 is in a ping-ponging state, the present embodiment totals a visit time length of a past visit to the cell C and a visit time length of a current visit to the cell C, for calculation of the visit time length.

FIG. 16 is a schematic diagram showing an update operation of the visit time length according to the present embodiment. The time series of FIG. 16 are the same as those described with reference to FIG. 5. In the following, the operation will be described in chronological order. An operation in a case in which no ping-ponging state has occurred is the same as that of the first embodiment (FIG. 5), and the description thereof is omitted. The user equipment 100 starts to visit a cell Ca at time t=25. The user equipment 100 (the ping-ponging state determiner 124) determines that a ping-ponging state has occurred with respect to the cell Ca when a difference d (d=10) between the visit ending time (t=15) of the previous visit (the latest among the past visits) to the cell Ca and the visit start time (t=25) of this time to the same cell is below the threshold Th1. Since it is determined that the ping-ponging state has occurred, the user equipment 100 (the calculator 126) stores the start time of a visit this time and a ping-ponging state determination flag indicating TRUE in the storage unit 130. Subsequently, the user equipment 100, upon ending the visit to the cell Ca at time t=50, totals the visit time length (L=10) of a past visit to the cell Ca and the visit time length (L=25) of the current visit to the cell Ca, to calculate the visit time length (L=35) of the visit to the cell Ca which has taken the ping-ponging state into consideration. The above is an operation in a case in which a ping-ponging state has occurred.

4(1)-2. Details of Update Operation

FIGS. 17 to 18 will be referred to, to provide a more detailed explanation of the update operation of the visit time length. Like in the first embodiment, description on the visit start process (S300) will first be given, and the description on the visit ending process (S200) follows thereafter.

The user equipment 100 starts to visit a cell Ca at time t=25. The visit start process executes Steps S100 and S310 in substantially the same ways as in the first embodiment, whereby the provisional visit start time (t=25) of the cell Ca is supplied from the cell visit detector 122 to the ping-ponging state determiner 124. When a change in a visited cell is detected, the ping-ponging state determiner 124 determines whether a ping-ponging state has occurred, to output a ping-ponging state determination flag indicating a result of the determination (S321).

The details of Step S321 will be described with reference to FIG. 18. The processes at Steps S3211 to S3213 of FIG. 18 are executed in substantially the same ways as those at S3201 to S3203 of FIG. 7. The ping-ponging state determiner 124 obtains a visit ending time (t=15) of the latest visit to the cell Ca and determines that a ping-ponging state has occurred when a difference d between the visit ending time and the provisional visit start time is below the threshold Th1 (S3213; YES). The ping-ponging state determiner 124 supplies a ping-ponging state determination flag indicating a logical value that is true (TRUE) and the provisional visit start time to the calculator 126 (S3216). When it is determined that no ping-ponging state has occurred (S3213; NO), the ping-ponging state determiner 124 sets a ping-ponging state determination flag indicating a logical value that is false (FALSE) and the provisional visit start time to the calculator 126 (S3217).

The calculator 126 writes a new visit information element SE4 including the cell identifier of the cell Ca, the ping-ponging state determination flag, and the provisional visit start time of the visit to the cell Ca, as the visit start time, supplied from the ping-ponging state determiner 124 into the visit information SI (the storage unit 130) (S331). FIG. 19 shows the visit information SI after the new visit information element SE4 was written therein.

The user equipment 100 subsequently ends the visit to the cell Ca at time t=50. In the visit ending process, Steps S100 and S210 are performed in substantially the same ways as those in the first embodiment. The ping-ponging state determination flag indicated by the visit information element SE4 that corresponds to the latest visit to the cell Ca is obtained (S221).

When the ping-ponging state determination flag indicates TRUE (S231; YES), the calculator 126 calculates a sum of a visit time length (L=10) and a difference (d=25) between a visit start time (t=25) indicated by the new visit information element SE4 and the visit ending time (t=50) obtained in Step S210, as the visit time length (L=35) of the visit to the cell Ca, the visit time length (L=10) being indicated by the visit information element SE2 that corresponds to a visit to the cell Ca immediately before the visit corresponding to the new visit information element SE4 (S241).

When the ping-ponging state determination flag indicates FALSE (S231; NO), the calculator 126 calculates a difference between the visit start time indicated by the new visit information element SE4 and the visit ending time obtained in Step S210 as the visit time length (L=35) of the visit to the cell Ca (S251).

Figure 20:
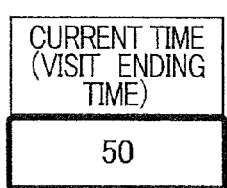
FIG. 20 is a configuration example of visit information stored in the storage unit.

The calculator 126 writes the visit ending time obtained in Step S210 and the visit time length obtained in Step S241 or S251 into the new visit information element SE4 (S261). FIG. 20 shows the visit information SI after the visit time length was written therein in this example (a case in which the ping-ponging determination flag is TRUE).

4(2). Effects of the Present Embodiment

With the above configuration, when the ping-ponging state has occurred, a ping-ponging state determination flag indicating TRUE is set to the visit information element SE, and a visit time length of a past visit and that of the current visit are totaled. Thus, the present invention enables a more appropriate calculation of a time length of visit to the cell C by the user equipment 100.

5. Fifth Embodiment

5(1). Update Operation Using Virtual Cell

5(1)-1. Overview

In the following, an update operation of the visit time length according to the present embodiment will be described. To give an overview, when it is determined that the user equipment 100 is in a ping-ponging state, the present embodiment regards multiple cells C as a virtual single cell (virtual cell), to perform a calculation operation of a visit time length for the virtual cell.

Figure 21:
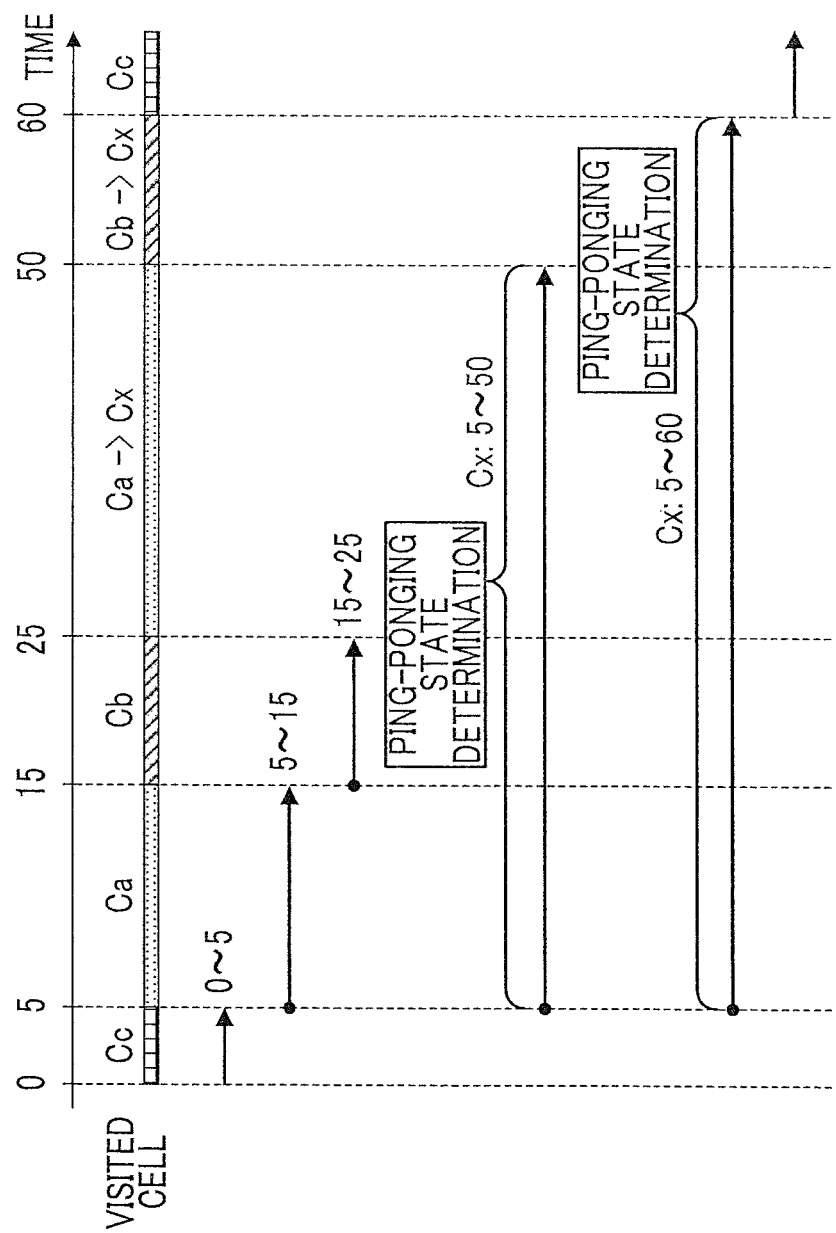
FIG. 21 is a schematic diagram illustrating an update operation of a visit time length according to a fifth embodiment.

FIG. 21 is a schematic diagram illustrating an update operation of the visit time length according to the present embodiment. The time series of FIG. 21 are the same as those described with reference to FIG. 5. The following explains distinguishing elements for the present embodiment in chronological order. The user equipment 100 again starts to visit a cell Ca at time t=25. The user equipment 100 (the ping-ponging determiner 124) determines that a ping-ponging state has occurred with regard to the cell Ca substantially in the same way as the above embodiments.

The user equipment 100 (the ping-ponging state determiner 124) groups the cell Ca and the cell Cb involved in the ping-ponging state, to be a virtual cell Cx. The cell identifier of the virtual cell Cx is stored in association with the cell Ca and the cell Cb in the storage unit 130. The user equipment 100 (the calculator 126) sets the true visit start time to be the visit start time (t=5) of a visit to the virtual cell Cx. Subsequently, the user equipment 100, upon ending the visit to the cell Ca at t=50, uses the true visit start time (t=5) and the visit ending time (t=50), to calculate the visit time length (L=45) of the visit to the virtual cell Cx including the cell Ca.

5(1)-2. Details of Update Operation

Figure 22:
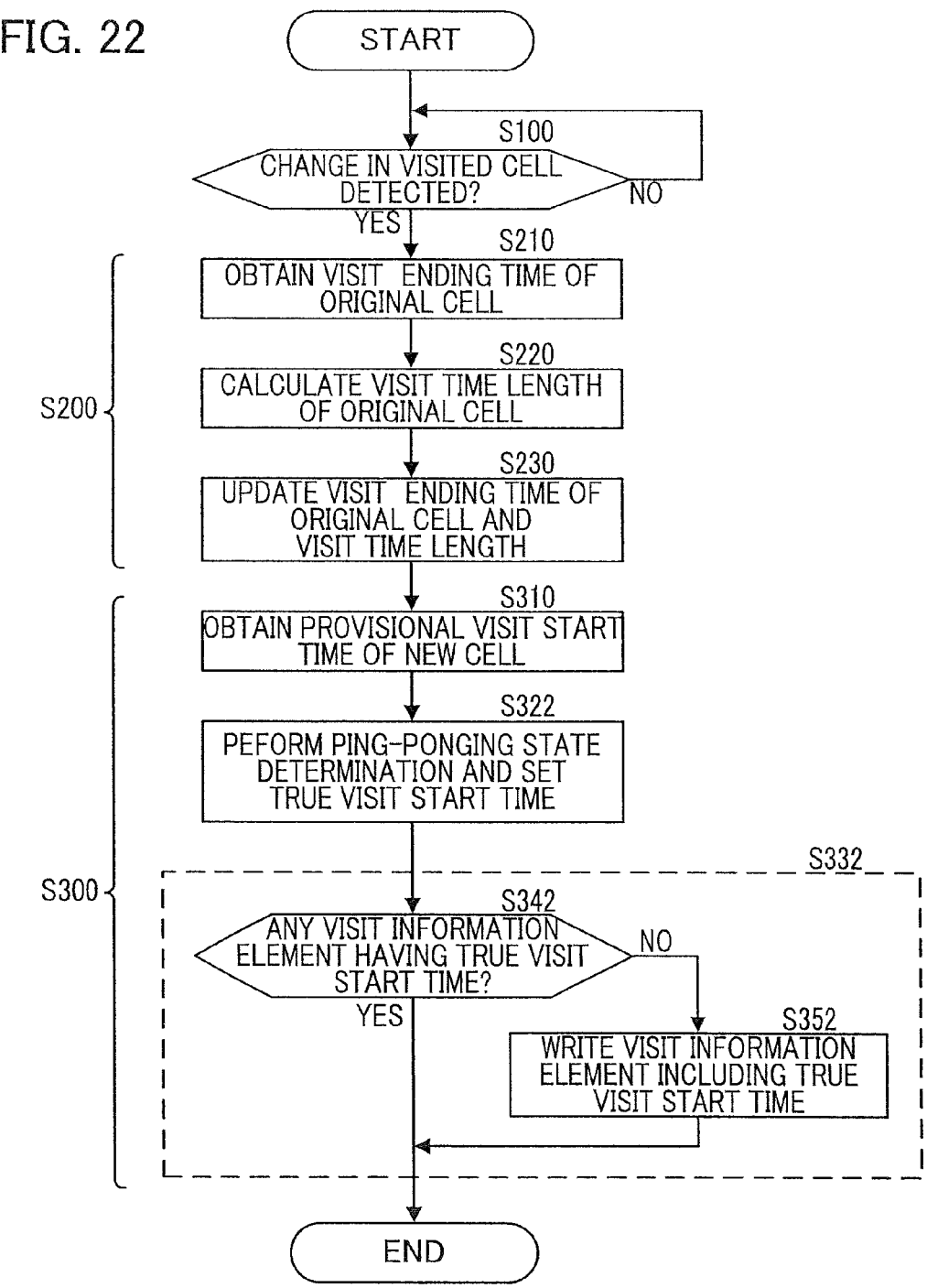
FIG. 22 is a flowchart of an update operation of the visit time length according to the fifth embodiment.
Figure 23:
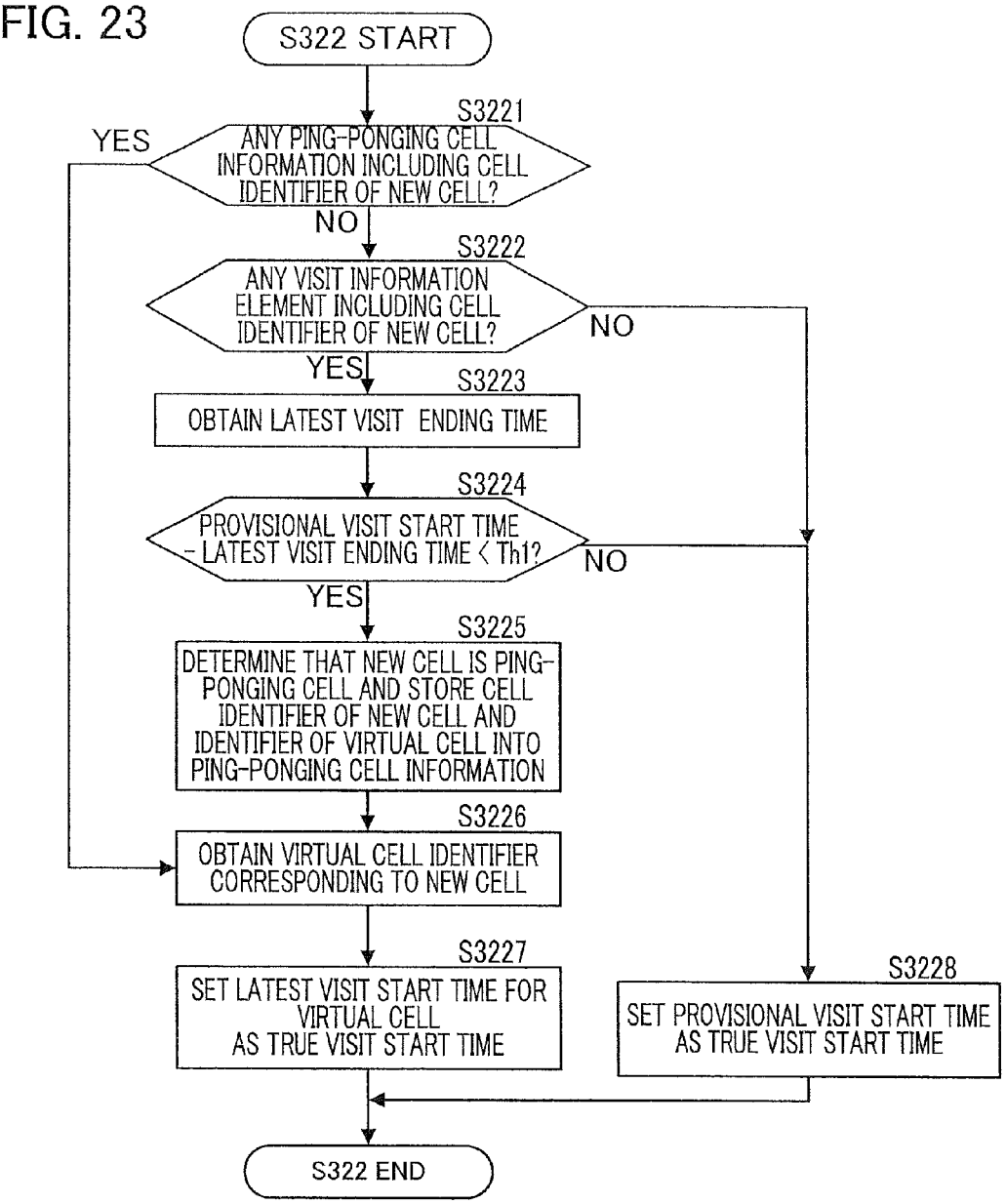
FIG. 23 is a flowchart of a detailed operation performed in Step S322 of the flowchart of FIG. 22.

FIGS. 22 to 25 will be referred to, to provide a more detailed explanation of the update operation of the visit time length. Like in the first embodiment, description on the visit start process (S300) will first be given, and the description on the visit ending process (S200) follows thereafter. FIGS. 22 and 23 are flowcharts illustrating an update operation, and FIGS. 24 and 25 illustrate example configurations of the visit information SI.

The user equipment 100 departs from the cell Cb and starts to visit the cell Ca at time t=25. The visit start process executes Steps S100 and S310 in substantially the same ways as in the first embodiment, whereby the provisional visit start time (t=25) of the cell Ca is supplied from the cell visit detector 122 to the ping-ponging state determiner 124. When a change in a visited cell is detected, the ping-ponging state determiner 124 determines whether a ping-ponging state has occurred, to set a virtual cell identifier and a true visit start time used for calculating a visit time length, for supply to the calculator 126 (S322).

The details of Step S322 will be described with reference to FIG. 23. The ping-ponging state determiner 124 determines whether ping-ponging cell information containing the cell identifier of the cell Ca, which is a new cell, is stored in the storage unit 130 (S3221).

When no ping-ponging cell information is stored (S3221; NO), the ping-ponging state determiner 124 determines whether a ping-ponging state has occurred in substantially the same ways as Steps S3201 to S3203 of the first embodiment (S3222 to S3224). When it is determined that the ping-ponging state has occurred (S3224; YES), the ping-ponging state determiner 124 assigns the cell identifier of the virtual cell Cx to the cell Ca and the cell Cb involved in the ping-ponging state and associates the cell identifier of the cell Ca and the cell identifier of the cell Cb with the cell identifier of the virtual cell Cx, for storage into the storage unit 130 as ping-ponging cell information (S3225). Furthermore, the ping-ponging state determiner 124 newly generates a visit information element SE4 corresponding to the virtual cell Cx, for storage into the storage unit 130 (S3225).

After Step S3225, or when a determination result of Step S3221 is YES (when the ping-ponging state has already occurred), the ping-ponging state determiner 124 obtains the cell identifier of the virtual cell Cx corresponding to the cell Ca (S3226). The ping-ponging state determiner 124 sets, as the true visit start time, the latest visit start time (t=5) indicated by the visit information element SE4 corresponding to the virtual cell identifier (Cx), from among plural visit information elements SE included in the visit information SI, to supply the cell identifier of the virtual cell Cx and the true visit start time to the calculator 126 (S3227).

When it is determined that no ping-ponging state has occurred (S3222; NO or S3224; NO), the ping-ponging state determiner 124 sets the provisional visit start time of the cell Ca as the true visit start time, to supply the cell identifier of the cell Ca and the true visit start time to the calculator 126 (S3228).

FIG. 22 is again referred to, to continue the explanation. The calculator 126 determines whether one or more visit start times corresponding to one or more visit information elements SE that correspond to the cell identifier supplied from the ping-ponging state determiner 124 include the true visit start time supplied from the ping-ponging state determiner 124 (S342). When the true visit start time is not included (S342; YES), the calculator 126 writes a new visit information element SE including the true visit start time and the cell identifier of a new cell into the visit information SI (storage unit 130) (S352). When the true visit start time is included (S342; YES), the calculator 126 does not write a new visit information element SE.

In this example, as shown in FIG. 24, since the visit information element SE4 that corresponds to the virtual cell Cx and that includes the true visit start time (t=5) is included in the visit information SI, the calculator 126 does not write a new visit information element SE. As a result, the visit information element SE4 having the true visit start time (t=5) is maintained as the visit information element SE that corresponds to the latest visit to the virtual cell Cx.

Subsequently, at time t=50, the cell visit detector 122, when it detects that the user equipment 100 departs from the cell Ca (original cell) to start visiting the cell Cb (new cell) (S100; YES), obtains the current time (t=50) as a visit ending time of the cell Ca (the virtual cell Cx), to supply the current time to the calculator 126 (S210). Description of the process (S300) with respect to the cell Cb is omitted.

The calculator 126 acquires the visit start time (t=5) indicated by the visit information element SE4 corresponding to the cell identifier of the virtual cell Cx and calculates a difference between the visit start time and the visit ending time (t=50) obtained in Step S210 as the visit time length (L=45) of the visit to the cell Ca (the virtual cell Cx) (S222). The calculator 126 writes, as shown in FIG. 25, the visit ending time (t=50) and the visit time length (L=45) into the visit information element SE4 (S232).

5(2). Effects of the Present Embodiment

With the above configuration, when it is determined that the user equipment 100 is in a ping-ponging state, multiple cells C with respect to which the ping-ponging state has occurred are associated as the virtual cell Cx, and a calculation operation of a visit time length for the virtual cell Cx is executed. Thus, the present invention enables a more appropriate calculation of a time length of visit by the user equipment 100.

6. Modifications

The above embodiments can be modified in various ways. Specific modifications are exemplified below. Two or more modes selected from the above embodiments and the following examples may be combined as long as they do not conflict.

6(1). Modification 1

In the visit ending process (S200) for the original cell, of the above embodiments, the calculator 126 writes the visit ending time and the visit time length into the visit information SI (the storage unit 130). However, the visit time length can be calculated as a difference between the visit start time and the visit ending time. Accordingly, in the visit ending process (S200) for the original cell, the calculator 126 may write only the visit ending time but not the visit time length into the visit information SI (storage unit 130). With the configuration above, the calculator 126 may calculate the visit time length by using the visit start time and the visit ending time stored in the visit information SI (storage unit 130).

6(2). Modification 2

In the above embodiments, the user equipment 100 has the cell visit detector 122, the ping-ponging state determiner 124, the calculator 126, and the storage unit 130 (visit information SI). However, at least one of the above elements may be provided at an apparatus (for example, the base station 200 or an exclusive server apparatus) provided in the network NW. For example, all of the cell visit detector 122, the ping-ponging state determiner 124, the calculator 126, and the storage unit 130 (visit information SI) may be provided at an apparatus in the network NW. Alternatively, the ping-ponging state determiner 124, the calculator 126, and the storage unit 130 (visit information SI) may be provided at an apparatus in the network NW. Alternatively, the storage unit 130 (visit information SI) may be provided at an apparatus in the network NW. In other words, each of the elements for implementing the present invention may be provided at a freely selected place in the radio communication system CS.

6(3). Modification 3

The user equipment 100 is a freely selected apparatus capable of performing radio communication with the base station 200. The user equipment 100 may be a portable telephone terminal such as a feature phone or a smart phone, or may be a desktop personal computer, a notebook personal computer, a UMPC (Ultra-Mobile Personal Computer), a portable game device, or any other radio terminal.

6(4). Modification 4

The functions executed by respective CPUs in each of the elements (the user equipment 100 and the base station 200) of the radio communication system CS may be executed by hardware instead of by the CPUs, or may be executed by programmable logic devices such as an FPGA (Field Programmable Gate Array) and a DSP (Digital Signal Processor).

DESCRIPTION OF REFERENCE SIGNS

100 . . . user equipment, 110 . . . radio communication unit, 120 . . . controller, 122 . . . cell visit detector, 124 . . . ping-ponging state determiner, 126 . . . calculator, 130 . . . storage unit, 130 . . . visit information storage unit, 200 . . . base station, 210 . . . radio communication unit, 220 . . . network communication unit, 230 . . . controller, C (Ca, Cb) . . . cell, CS . . . radio communication system, Cx . . . virtual cell, NW . . . network, SE . . . visit information element, SI . . . visit information, and Th . . . threshold.

The invention claimed is:
1. A radio communication system comprising:
a visit information storage unit configured to store plural visit information elements each indicating information on a visit to a cell visited by a user equipment;
a cell visit detector configured to detect that a user equipment that was visiting a first cell starts to visit a second cell differing from the first cell;
a ping-ponging state determiner configured to determine whether a ping-ponging state has occurred, in which state start and ending of a visit to the second cell is repeated, wherein the determination is made based on a visit information element on the visit to the second cell visited by the user equipment; and
a calculator configured to calculate a visit time length of the visit to the second cell in accordance with the determination by the ping-ponging state determiner,
wherein, when the ping-ponging state determiner determines that the ping-ponging state has occurred, the calculator calculates the visit time length of the visit to the second cell so that the visit time length is longer than a visit time length of when the ping-ponging state determiner determines that the ping-ponging state has not occurred.

2. The radio communication system according to claim 1, wherein the cell visit detector supplies a current time as a provisional visit start time to the ping-ponging state determiner when the cell visit detector detects that the user equipment departs from the first cell and starts to visit the second cell,
wherein the ping-ponging state determiner supplies to the calculator, as a true visit start time, a visit start time indicated by a visit information element corresponding to the latest visit to the second cell from among the plural visit information elements stored in the visit information storage unit when the ping-ponging state determiner determines that the ping-ponging state has occurred, whereas the ping-ponging state determiner supplies to the calculator the provisional visit start time as a true visit start time when the ping-ponging state determiner determines that the ping-ponging state has not occurred,
wherein the calculator writes a new visit information element containing the true visit start time into the visit information storage unit when plural visit start times indicated by the plural visit information elements do not include the true visit start time, whereas the calculator does not write a new visit information element into the visit information storage unit when plural visit start times indicated by the plural visit information elements include the true visit start time,
wherein, when the cell visit detector subsequently detects that the user equipment departs from the second cell and starts visiting another cell, the cell visit detector acquires a current time as a visit ending time of the second cell, to supply the current time to the calculator, and
wherein the calculator acquires a visit start time indicated by a visit information element corresponding to the latest visit to the second cell from among the plural visit information elements and calculates a difference between the visit start time and the visit ending time as the visit time length of the visit to the second cell.

3. The radio communication system according to claim 2, wherein the ping-ponging state determiner determines that the ping-ponging state has occurred when a difference between a visit ending time and the provisional visit start time is below a threshold, the visit ending time being indicated by the visit information element corresponding to the latest visit to the second cell from among the plural visit information elements stored in the visit information storage unit, whereas the ping-ponging state determiner determines that the ping-ponging state has not occurred when the difference is above the threshold or when the visit information storage unit does not store a visit information element on the visit to the second cell.

4. The radio communication system according to claim 3, wherein, when the cell visit detector detects that the user equipment maintains the visit to the second cell, the cell visit detector acquires a current time as the visit ending time of the second cell, to supply the current time to the calculator, and wherein the calculator acquires a visit start time indicated by the visit information element corresponding to the latest visit to the second cell from among the plural visit information elements stored in the visit information storage unit, to calculate a difference between the visit start time and the visit ending time as the visit time length of the visit to the second cell.

5. The radio communication system according to claim 1, wherein the cell visit detector supplies a current time as a provisional visit start time to the ping-ponging state determiner when the cell visit detector detects that the user equipment leaves the first cell and starts to visit the second cell, wherein the ping-ponging state determiner supplies to the calculator, as a true visit start time, a visit start time indicated by a visit information element corresponding to the latest visit to the second cell from among the plural visit information elements stored in the visit information storage unit when the ping-ponging state determiner determines that the ping-ponging state has occurred, whereas the ping-ponging state determiner supplies to the calculator the provisional visit start time as a true visit start time when the ping-ponging state determiner determines that the ping-ponging state has not occurred, wherein the calculator writes a new visit information element containing the true visit start time supplied from the ping-ponging state determiner into the visit information storage unit, wherein, when the cell visit detector subsequently detects that the user equipment departs from the second cell and starts visiting another cell, the cell visit detector acquires a current time as a visit ending time of the second cell, to supply the current time to the calculator, wherein the calculator acquires a visit start time indicated by an incomplete visit information element corresponding to the visit to the second cell and not containing a visit ending time, from among the plural visit information elements stored in the visit information storage unit, to calculate, as the visit time length of the visit to the second cell, a difference between the visit start time and the visit ending time supplied from the cell visit detector.

6. The radio communication system according to claim 5, wherein the ping-ponging state determiner determines that the ping-ponging state has occurred when a frequency of visits to the second cell indicated by the plural visit information elements stored in the visit information storage unit is above a threshold, whereas the ping-ponging state determiner determines that the ping-ponging state has not occurred when the frequency is below the threshold or when the visit information storage unit does not store a visit information element on the visit to the second cell.

7. The radio communication system according to claim 1, wherein the cell visit detector supplies a current time as a provisional visit start time to the ping-ponging state determiner when the cell visit detector detects that the user equipment departs from the first cell and starts to visit the second cell, wherein the ping-ponging state determiner determines that the ping-ponging state has occurred when a difference between a visit ending time and the provisional visit start time is below a threshold, the visit ending time being indicated by a visit information element corresponding to the latest visit to the second cell from among the plural visit information elements stored in the visit information storage unit, and supplies a ping-ponging state determination flag indicating TRUE and the provisional visit start time to the calculator, whereas the ping-ponging state determiner determines that the ping-ponging state has not occurred when the difference is above the threshold or when the visit information storage unit does not store a visit information element on the visit to the second cell, and supplies a ping-ponging state determination flag indicating FALSE and the provisional visit start time to the calculator, wherein the calculator writes, into the visit information storage unit, a new visit information element containing the ping-ponging state determination flag and the provisional visit start time as the visit start time, the ping-ponging state determination flag and the provisional visit start time being supplied from the ping-ponging state determiner, wherein, when the cell visit detector subsequently detects that the user equipment departs from the second cell and starts visiting another cell, the cell visit detector acquires a current time as a visit ending time of the second cell, to supply the current time to the calculator, wherein the calculator acquires the ping-ponging state determination flag indicated by the new visit information element corresponding to the latest visit to the second cell from among the plural visit information elements stored in the visit information storage unit, and when the ping-ponging state determination flag indicates TRUE, to calculate a sum of a visit time length and a difference as the visit time length of the visit to the second cell, wherein the visit time length is indicated by a visit information element that corresponds to a visit to the second cell immediately before the visit corresponding to the new visit information element, and the difference is a difference between a visit start time indicated by the new visit information element and the visit ending time, whereas when the ping-ponging state determination flag indicates FALSE, the calculator calculates, as the visit time length of the visit to the second cell, a difference between a visit start time indicated by the new visit information element and the visit ending time.

8. The radio communication system according to claim 1, wherein the cell visit detector supplies a current time as a provisional visit start time to the ping-ponging state determiner when the cell visit detector detects that the user equipment departs from the first cell and starts to visit the second cell, wherein the ping-ponging state determiner, when it determines that the ping-ponging state has occurred, assigns a virtual cell identifier to a plurality of cells including the second cell that are involved in the ping-ponging state, stores a visit information element having the virtual cell identifier in the visit information storage unit, sets, as a true visit start time, a visit start time indicated by a visit information element that corresponds to the latest visit corresponding to the virtual cell identifier, and supplies the virtual cell identifier and the true visit start time to the calculator, wherein the ping-ponging state determiner, when it determines that the ping-ponging state has not occurred, sets the provisional visit start time as a true visit start time, and supplies a cell identifier of the second cell and the true visit start time to the calculator, wherein, when one or more visit start times indicated by one or more visit information elements corresponding to the virtual cell identifier or the cell identifier of the second cell supplied from the ping-ponging state determiner do not include the true visit start time, the calculator writes a new visit information element containing the true visit start time and the supplied virtual cell identifier or the cell identifier of the second cell into the visit information storage unit, whereas the calculator does not write a new visit information element into the visit information storage unit when one or more visit start times indicated by one or more visit information elements corresponding to the supplied virtual cell identifier or the cell identifier of the second cell include the true visit start time, wherein, when the cell visit detector subsequently detects that the user equipment departs from the second cell and starts visiting another cell, the cell visit detector acquires a current time as a visit ending time of the second cell, to supply the current time to the calculator, and wherein the calculator acquires a visit start time indicated by a visit information element that corresponds to the latest visit from among visit information elements corresponding to the virtual cell identifier corresponding to the second cell, to calculate a difference between the visit start time and the visit ending time as the visit time length of the visit to the second cell.

9. A communication control method comprising:

storing plural visit information elements each indicating information on a visit to a cell visited by a user equipment;

detecting that the user equipment that was visiting a first cell starts a visit to a second cell differing from the first cell;

determining whether a ping-ponging state has occurred, in which state start and ending of a visit to the second cell is repeated, wherein the determination is made based on a visit information element on a visit to the second cell visited by the user equipment; and calculating a visit time length of the visit to the second cell in accordance with the determination of the ping-ponging state, wherein, the determining comprises calculating the visit time length of the visit to the second cell so that the visit time length is longer than a visit time length of when the determining determines that the ping-ponging state has not occurred.

10. The radio communication system according to claim 1, wherein, when the ping-ponging state determiner determines that the ping-ponging state has occurred, the calculator calculates the visit time length of the visit to the second cell using a visit start time, as a true visit start time, indicated by a visit information element corresponding to the latest visit to the second cell from among the plural visit information elements stored in the visit information storage unit.

11. A communication control method according to claim 9, wherein the calculating comprises, when the ping-ponging state has occurred, calculating the visit time length of the visit to the second cell using a visit start time, as a true visit start time, indicated by a visit information element corresponding to the latest visit to the second cell from among the plural visit information elements.

* * * * *